(12) United States Patent
Vasudevan et al.

(10) Patent No.: US 7,028,057 B1
(45) Date of Patent: Apr. 11, 2006

(54) VERSIONED RELATIONAL DATABASE SYSTEM WITH AN OPTIMISTIC CONSTRAINT MODEL

(75) Inventors: Ramesh Vasudevan, Nashua, NH (US); Sanjay Agarwal, Nashua, NH (US); Ramkrishna Chatterjee, Nashua, NH (US); Benjamin Speckhard, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 285 days.

(21) Appl. No.: 10/205,209

(22) Filed: Jul. 25, 2002

Related U.S. Application Data

(63) Continuation-in-part of application No. 09/557,592, filed on Apr. 22, 2000, now Pat. No. 6,584,476.

(51) Int. Cl.
*G06F 17/30* (2006.01)
(52) U.S. Cl. ..................................... 707/203
(58) Field of Classification Search .............. 707/8, 707/100, 200, 701, 202, 203, 201
See application file for complete search history.

(56) References Cited

U.S. PATENT DOCUMENTS

| | | | | |
|---|---|---|---|---|
| 5,504,879 | A | * | 4/1996 | Eisenberg et al. .......... 707/100 |
| 5,600,832 | A | * | 2/1997 | Eisenberg et al. .......... 707/203 |
| 5,862,325 | A | * | 1/1999 | Reed et al. ................ 709/201 |
| 5,890,166 | A | | 3/1999 | Eisenberg et al. |
| 6,415,299 | B1 | * | 7/2002 | Baisley et al. .............. 707/203 |
| 6,460,052 | B1 | * | 10/2002 | Thomas et al. ............. 707/203 |
| 6,584,476 | B1 | * | 6/2003 | Chatterjee et al. .......... 707/203 |

OTHER PUBLICATIONS

Hyun-Ju park et al., Implementation of Checkout/Checkin Mechanism on Object-Oriented Database Systems, IEEE, Database and Expert Systems Applications, 1996 Proceedings., Seventh Inter. Workshop on, Sep. 9-10, 1996, pp. 298-303.*
Oracle9i: Application Developer's Guide—Workshop Manager, Release 2 (9.2) Mar. 2002, Part No. A96628.

\* cited by examiner

*Primary Examiner*—Greta Robinson
(74) *Attorney, Agent, or Firm*—Gordon E. Nelson

(57) ABSTRACT

Techniques for doing optimistic constraint checking in a versioned relational database system. The techniques find a subset of the versions of a table that contain all of the rows that need be checked for violation of a constraint when a given version is modified. When the versions of a table are organized into a directed acyclic graph (DAG), the subset for a given version is the ancestry of the given version, that is, the given version plus the ancestors of the given version in the DAG. Within the ancestry, the set of rows that must be checked is termed the version view. A row that belongs to the set has a primary key that is the latest version of the primary key in the given version's ancestry. The technique may be used for constraints including the referential integrity constraint and the unique key constraint. The metadata used to compute the version view is disclosed, as well as the manner in which the constraint checking techniques interact with the workspaces that provide access to the versions. The workspaces may be organized as a DAG. The manner in which the workspaces are organized determines how changes are propagated in the versioned relational database and thus the versions whose ancestry has to be checked for constraint violations.

44 Claims, 18 Drawing Sheets

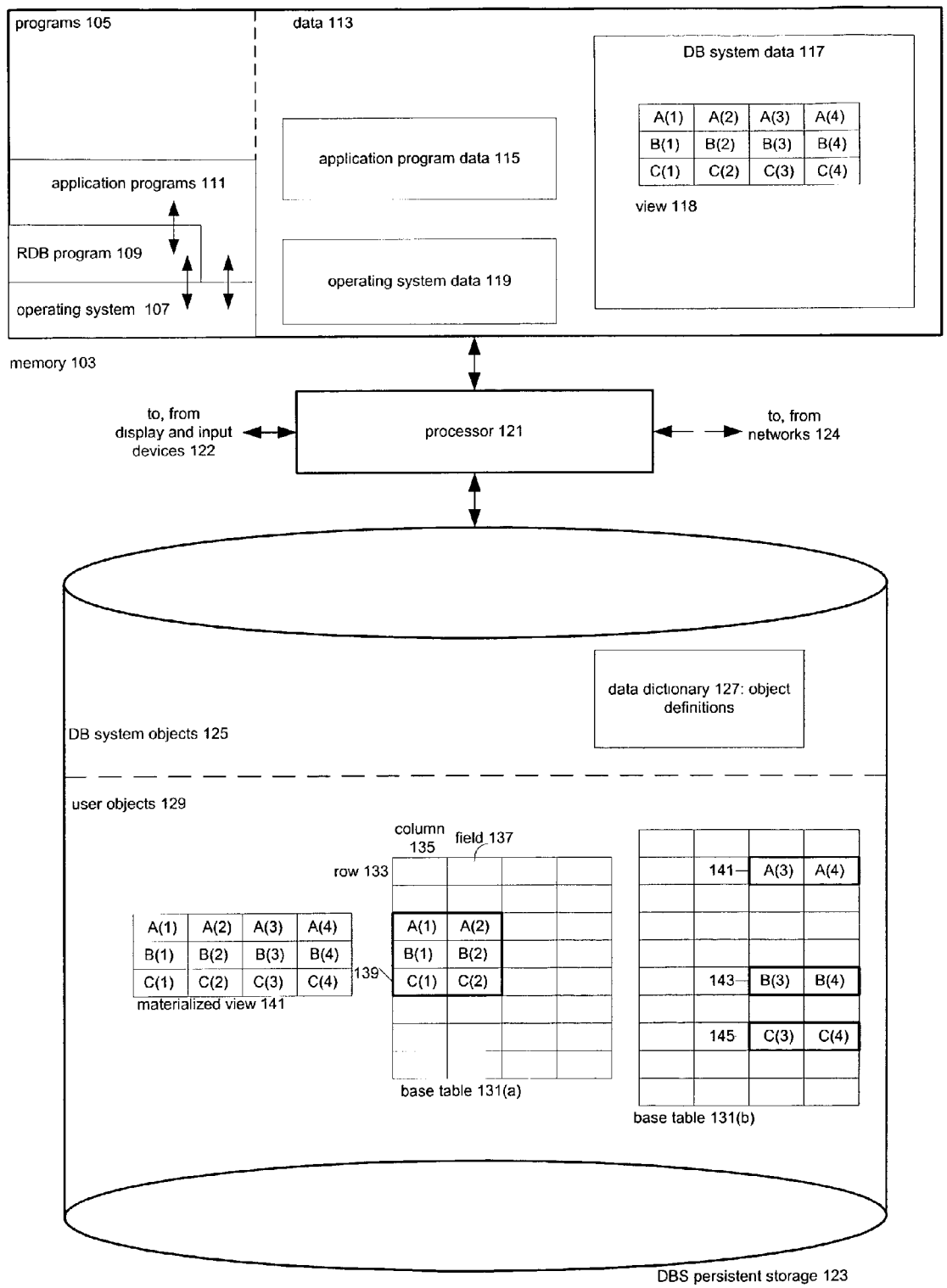
Prior Art  Fig. 1

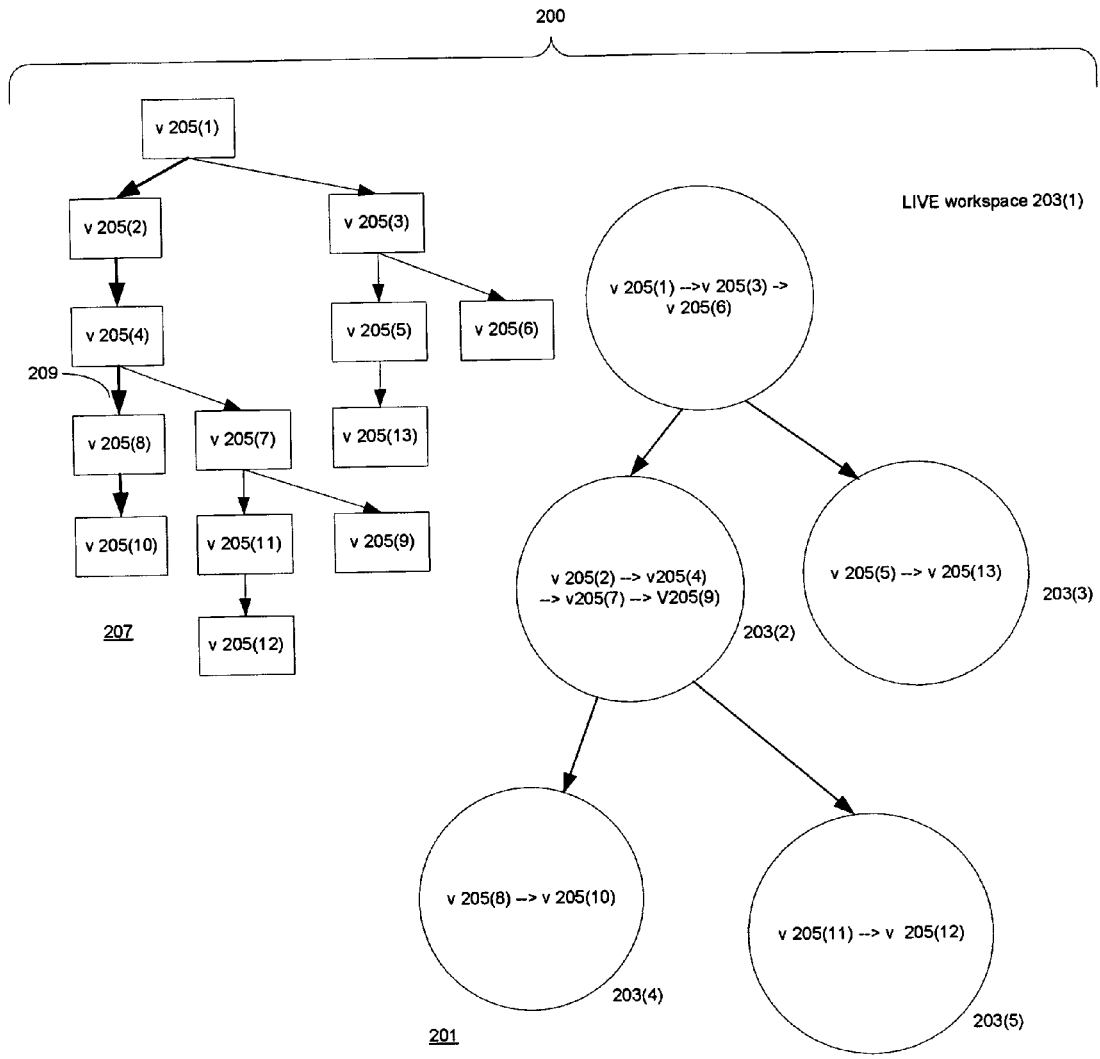

merge 203(4): changes made in v 205(10) in workspace 203(4) applied to v 205(9) in workspace 203(2).

refresh 203(4): changes made in v205(9) in workspace 203(2) applied to v 205(10) in workspace 203(4).

continual refresh: done automatically by VRDBS. Any change in the current version in LIVE workspace 203(1) is automatically applied to the current versions in descendant workspaces of LIVE in hierarchy 201 for which continual refresh has been specified.

|  | USER DATA FIELDS | | VERSION MANAGEMENT FIELDS | | | | |
|---|---|---|---|---|---|---|---|
| | FIELD 21(1) | FIELD 21(J) | VER ID FIELD 22 | NXTVER ID FIELD 23 | SYNC FIELD 24 | LOCKS FIELD 25 | DEL FLAG 26 |
| ROW20(1) → | | | | | | | |
| ROW20(2) → | | | | | | | |
| ROW20(3) → | | | | | | | |
| ROW20(4) → | | | | | | | |
| ROW20(I-2) → | | | | | | | |
| ROW20(I-1) → | | | | | | | |
| ROW20(I) → | | | | | | | | database table 13(n)

FIG. 6 wm$ancestor_workspaces_table 703

| Workspace (705) | anc_workspace (707) | anc_version (709) |
|---|---|---|
| .... | | |
| w5 | w3 | v3 |
| .... | | | wm$version_hierarchy_table 733

| version (735) | parent_version (737) | workspace (739) |
|---|---|---|
| v0 | NULL | LIVE |
| v1 | v0 | LIVE |
| v2 | v1 | w2 |
| v3 | v2 | w3 |
| v4 | v2 | w4 |
| v5 | v3 | w5 |
| v6 | v5 | w6 |
| ... | .... | .... |

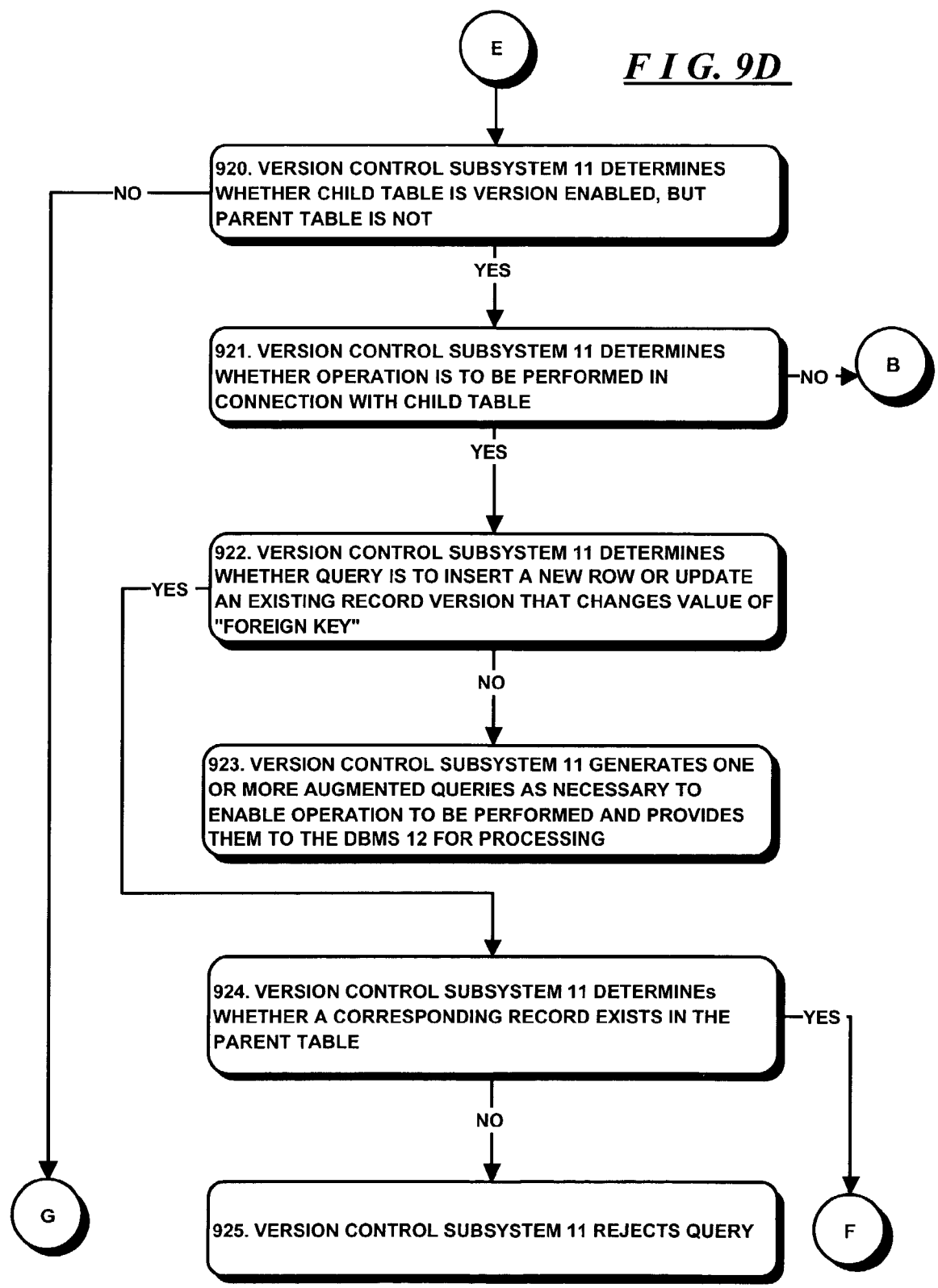

continual refresh: done automatically by VRDBS. Any change in the current version v 1305(2) in workspace 1303(2) is automatically applied to the current version 1305(7) in workspace 1303(4) and the current version 1305(10) in workspace1303(5). Workspaces 1303(4 and 5) were specified as being continually refreshed when they were created.

VERSIONED RELATIONAL DATABASE SYSTEM WITH AN OPTIMISTIC CONSTRAINT MODEL

RELATED APPLICATIONS

The present patent application is a continuation-in-part of U.S. Ser. No. 09/557,592, Ramkrishna Chatterjee, et al., System and method for enforcing referential constraints between versioned database tables, filed Apr. 22, 2000, and having the same assignee as the present patent application. U.S. Ser. No. 09/557,592 issued June 24, 2003 as U.S. Pat. No. 6,584,476. That patent is further incorporated by reference in its entirety into the present patent application. The portion of the present application which is taken from the parent is in the section titled RIC checking in a VRDBS. The present application is also closely related to U.S. Ser. No. 10/205,084. Sanjay Agarwal and Ramkrishna Chatterjee, Versioned database system with multi-parent versions, filed on even date with the present patent application and having the same assignee.

BACKGROUND OF THE INVENTION

1. Field of the Invention

The invention relates to relational database systems generally and more specifically to detection of constraint violations in versioned relational database systems.

2. Description of Related Art: FIGS. 1, 2, 4, and 5

Database systems are systems which store data and permit users of the systems to access items of the data by means of queries which describe the data in terms of the structure given the data by the database system. A common kind of database system is a relational database system. In such systems, the data is organized as a set of tables. A relational database table has a fixed number of columns and a variable number of rows. Each row has a field corresponding to each column, and the field contains a value. Queries on relational databases specify the data to be accessed in terms of the table or tables that contain it, columns in the table, and values of fields in some of the specified columns. For example, a simple table employees might look like this:

| emp_no | emp_name |
|--------|----------|
| 001    | Jones    |
| 002    | Smith    |
| 003    | Andrews  |
| 004    | Todd     |

The table has two columns, named emp_no, whose fields contain employee numbers, and emp_name, whose fields contain employee names, and four rows. A query that returned the name of the employee with the employee number "002" would look like this in the standard SQL language used with relational database systems:

SELECT emp_name FROM employees WHERE emp_no=002;

When the database system executes the query, it finds the row in the table employees whose field in the column emp_no has the value "002" and returns the value of the field in the row belonging to the column emp_name, or "Smith".

FIG. 1 shows the portions of a typical relational database system 101 that are relevant to the present discussion. The main components of system 101 are a processor, a memory 103 which contains programs 105 being executed by the processor and data 113 involved in the program executions, and persistent storage 123 for the database system's tables and other objects. Processor 121 may further receive inputs from input devices such as a keyboard and/or pointing device and produce outputs to a display device such as a CRT, as shown at 122, and may also receive inputs from and provide outputs to one or more networks, containing other processors, as shown at 124.

When system 101 is operating, programs 105 in memory 103 include an operating system 107, a relational database system program 109, and application programs 111 that employ the services provided both by operating system 107 and database program 109. Correspondingly, data 113 in memory 103 includes data for the application programs, data for the operating system, and data for the database system. Operation typically involves an application program 111, which provides a query to relational database program 109. Database program 109 executes the query on the tables in persistent storage 123 and provides the result to application program 111. Both RDB program 109 and application program 111 use the services provided by operating system 107, and execution of the application program or the database RDB program may involve inputs from and outputs to I/O devices and the network.

Continuing in more detail, persistent storage 123 contains two classes of objects: DB system objects, which are objects, including tables, that database system 101 uses to manage and operate the database system, and user objects 129, which contain tables and other objects defined by users of the database system. In the present context, the only system objects which are important are those belonging to data dictionary 127, which contains definitions of all of the objects in the database system.

User tables include base tables 131, views 118, and materialized views 141. Base tables 131 are the tables that are the actual sources of the data returned by a query. Views are tables which do not exist in their own rights in persistent storage 123, but are instead created using data from other tables. Data dictionary 127 contains definitions of base tables, of tables defined in terms of the base tables, and definitions of other objects that are defined for the tables. These other objects include indexes, which speed up access to the data contained in a column of a table, triggers, which define actions to be taken upon occurrence of events concerning the table, and constraints, i.e. rules about the values that must be in the fields.

A view is defined in the data dictionary by a query on other tables. The other tables may also be views, but the data must ultimately come from base tables. View 118 contains four columns and three rows. The data in columns 1 and 2 comes from columns 1 and 2 of base table 131(a); the data in columns 3 and 4 comes from columns 3 and 4 of base table 131(b); the query that defines view 118 has selected the fields of columns 1 and 2 of rows 3–5 of table 131(a) and the fields of columns 3 and 4 of rows 2, 6, and 8 of table 131(b). When relational database system 101 executes a query on a view 118, it must first make the view, which requires running the query which defines the view; consequently, if the view is frequently queried, the view may be made into a materialized view 141, which is a copy of the view which has been stored in persistent storage 123. Data dictionary 127 keeps track of the fact that there is a materialized view 141 corresponding to view 118, and database system 101 redirects a query of view 118 to materialized view 141.

Versioned Database Systems: FIG. 4

A versioned database is one in which different versions of the database exist simultaneously. What users of the versioned database see is the different versions, rather than the underlying base tables. Versioned databases are typically used in research and development situations: when a new line of research which will affect an existing database begins, a new version of the database is associated with the line of work, and the results of the research are incorporated into the new version of the database. When the work is to the point where it can be incorporated into the existing database, the new version is merged into the existing database.

A commercially-available system for creating and managing versioned databases is Oracle Workspace Manager, a versioned relational database system (VRDBS), implemented in the Oracle 9i™ database system manufactured by Oracle Corporation and described in detail in the Oracle 9i Application Developer's Guide—Workspace Manager, Release 1 (9.0.1), Part Number A88806-01, available in March, 2002 at http://technet.oracle.com. This publication is incorporated by reference into the present patent application. FIG. 4 presents an overview of a versioned relational database system 401 and FIG. 5 presents relevant details of its implementation in the Oracle Workspace Manager. Shown in FIG. 4 is an example table, emp_table 403, which is a table of employee information. There is a row for each employee. The table has four columns: emp_id 404, which contains a unique identifier for each employee, name 405, whose fields contain the employees' names, salary 407, whose fields contain the employees' salaries, and address 409, whose fields contain the employees' addresses. The values of the emp_id fields are the primary keys for the table and must consequently obey a uniqueness constraint within the table. As will be explained in more detail in the following, metadata may be added to emp_table 403 to make it possible to maintain different versions of the table. A table to which such metadata has been added is termed a version-enabled table.

Workspaces and Versions: FIG. 2

In the versioned relational database, the different versions of emp_table 403 are maintained simultaneously, with independent access to each of the versions. Access to a given version is by means of a workspace. A workspace has a number of functions in the preferred embodiment:

it is a virtual environment that one or more users can share to make changes to versions of a version-enabled table.

it logically groups versions of one or more version-enabled tables, and isolates these versions until they are explicitly merged with production data or discarded, thus providing maximum concurrency; and the relationships between workspaces determine how changes can be propagated from one version to another.

Users can perform a variety of operations involving workspaces: go to navigates among workspaces; create, remove, and compress; refresh and merge propagate changes from a version in one workspace to a version in another workspace, and rollback returns to an earlier version in a workspace. There are two types of workspaces: non-continual refresh (non CR) and continual refresh (CR). The non CR workspace has a frozen view of version-enabled table data; changes made in any of the parent workspace of the non CR workspace after the workspace was created will not be visible from the workspace. In contrast, the CR workspace has a continually updated view of the version-enabled tables. Any changes made in the parent workspace also will be instantly visible from the child.

When a table is version-enabled, the table as it exists at the time it is version-enabled is the first version. This first version exists in a single workspace, termed the LIVE workspace. The first version may be modified in the same way as the table prior to versioning. A new version is established by a savepoint operation, which freezes the old version. The old version is made read only, and further modifications are made on the new version. The version in a workspace on which modifications may be made is termed the workspace's current version. A user of a workspace may explicitly specify a savepoint operation, and there is an implicit savepoint operation whenever a new workspace is created. A new workspace is always created as a child of an existing workspace, and the child workspace starts off with a newly created version that is a copy of the parent workspace's current version as of the time the child workspace is created; unless the parent workspace has a descendant that is a CR workspace, the implicit savepoint further creates a new version in the parent workspace, and that version is now the current version in the parent workspace. Where there is a CR descendant, the new version is not created in the parent workspace and the version from which the child workspace was created remains the current version in the parent workspace. After creation of the child workspace, the current versions in the parent workspace and the child workspace may of course be modified independently. A given workspace may thus have a linear set of versions that are descendants of the version made when the workspace was created and any of the versions in the linear set may have descendants in workspaces that are descendants of the given workspace. The versioned database system includes metadata which keeps track of the hierarchy of versions in the system.

FIG. 2 shows at 200 how workspaces relate to each other, how versions relate to each other, and how workspaces and versions relate to each other. Workspace hierarchy 201 includes workspaces 203(1 . . . 5), which were created in the order in which they are numbered. Each workspace contains versions 205 of a version-enabled table; versions 205(1 . . . 13) are numbered in the order in which they were created in workspace hierarchy 201. At the moment shown in hierarchy 201, the current versions are 205(6), 205(9), 205(13), 205(10), and 205(12). Of course, a given workspace may include versions of a number of version-enabled tables. The version hierarchy for the versions is shown at 207. A branch of the version hierarchy is a path through the hierarchy from the root version to a single leaf version. One such branch 209 is shown by means of heavy arrows. The ancestors of a given version are the versions that are above it on the version's branch of the hierarchy. Thus, the ancestors of v 205(9) are v205(7), v 205(4), v 205(2), and v 205(1). The descendants of a given version are all of the versions below the given version in all of the branches of the hierarchy that pass through the given version. Thus, all of the versions are descendants of v 205(1), while the descendants of v 205(3) are v 205(5), v205(13), and v 205(6). There are similarly branches, ancestors, and descendants in the workspace hierarchy.

One application of a versioned relational database is doing "what if" exercises with different versions of the data in the database system. In FIG. 4, such an exercise is being performed on a version enabled table, emp_table 403. When emp_table 403 was version enabled, the result was LIVE workspace 410(0) containing live version 403(0) of emp_table 403. A user of the versioned relational database has made three new workspaces 410(1 . . . 3) containing versions 403(1,3,5) of emp_table. When workspace 401(1) was made, it contained version 403(1) and version 403(2) was made the current version of workspace 410(0). Both version 403(1) and version 403(2) are copies of version 403(0). Similarly, when workspace 410(2) was made, it contained version 403(3) and the new current version of workspace 410(0) was version 403(4) and when workspace 410(3) was made, it contained version 403(5) and the new current version of workspace 410(0) was version 403(6). Live emp_table 403(0, 2, 4) was not modified during creation of workspaces 410(1,2, and 3), so versions 403(0,2,4,6) are identical with each other, with version 403(6) being the current version in workspace 410(0). The version hierarchy for versions 403(0 . . . 6) of emp_table 403 is shown at 411.

Having made the new version, the user then modifies the new version in the version's workspace as required. In the example, current version 403(6) in live workspace 410(0) is a table of the current employees. One of the workspaces, 410(1), contains a pessimistic version 403(1) for a business scenario in which times are hard and employees must be reduced to a minimum; one 410(2), a current level version 403(3), for a scenario in which the present business conditions continue and the number of employees needs a smaller reduction, and one 410(3), an optimistic version 403(5), for a scenario in which business improves and only a minimal reduction need be considered.

Workspace hierarchy 401 has at its top workspace 410(0) for live emp_table versions 403(0,2,4,6). Current version 403(6) is currently available to users other than the ones who are making the versions. At the next level are the three workspaces 410(1 . . . 3) for table versions 403(1,3,5). To make an additional workspace based on any workspace in the hierarchy, one simply goes to that workspace and makes the new workspace. The additional workspace is a child of the workspace in which it was made. Change propagation operations are available to propagate changes in a workspace's version up or down the workspace hierarchy to a version in another workspace. The version to which the change is propagated replaces rows which have changed less recently than the corresponding row in the version from which the change is propagated with the corresponding row in the latter version. Thus, if times are hard, workspace 410(1) may be merged with workspace 410(0). After the merger, the current live version 403(6) will have the most recently modified rows from pessimistic version 403(1) and live version 403(6).

Change Propagation Operations in the Workspace Hierarchy: FIG. 2

Operations in the VRDBMS which may result in propagation of changes from one table version to another are the following:

when a data manipulation (DML) operation is performed on a record in a table version in a workspace. DML operations are always performed on the current version.

when a DML operation performed on the current version of a table a workspace results in a continual refresh of the current versions of the table in descendants of the workspace that have been created with the continual refresh operation; thus, if workspaces 203(2) and 203(3) are continual refresh (CR) workspaces, continual refresh will apply any change made in current version 205(6) in LIVE workspace 203(1) to current version 205(9) in workspace 203(2) and to current version 205(13) in workspace 203(3).

when a user performs a refresh operation on a workspace; refresh propagates the changes in the current version in a parent workspace relative to the current version in a child workspace to the current version in the child workspace; thus a refresh operation that specifies workspace 203(4) applies changes from current version 205(9) in workspace 203(2) to current version 205(10) in workspace 203(4).

when a user performs a merge operation on a workspace; merge propagates the changes in the current version in a child workspace relative to the current version in the child's parent workspace to the current version in the parent workspace; thus a merge operation that specifies workspace 203(4) propagates changes from current version 205(10) to current version 205(9) in workspace 203(2).

when a user performs a DDL operation that redefines a version-enabled table. Such an operation of course affects every version of the table.

Implementation of the Versions: FIG. 5

In the Oracle Workspace Manager, the table versions in the workspaces are implemented by displaying the results of queries on tables. The queried tables may be views or base tables. The tables contains not only the information that is of interest to the users of the versioned database, but additional columns for version information which the database system uses to generate the query results corresponding to each of the versions. FIG. 5 shows at 500 how all of this is done. Redefinition 501 of emp_table 403, emp_table_LT 501, contains version info columns 502 and additional rows of information 511(1.3). The information in the version information columns and in the additional rows permits the generation of results corresponding to tables 403(0,3, and 5) from table 501, as shown at 513, 521, and 523.

Continuing with version information columns 502, there are four such columns:

version number 503: the value in a row's field in this column is the number of the version that the row with its present contents was created in.

child version numbers 505: this field contains a list of numbers of descendant versions of the version specified at 503 where the row has been modified.

deleted flag 507: this field indicates whether the row has been deleted in the version indicated in field 503; and lock flag 509: this field indicates whether the row is currently locked.

Changes are made in table 501 by users working in various workspaces. Changes may include modifications of values in fields of the table and addition or deletion of rows.

When a row is changed in a version of the table so that it is no longer identical with a row higher in the hierarchy, the new version of the row is added to table 501, with version number 503 set to indicate which version the added row was changed in. Child version field 505 of the row in the parent version that the changed row was formerly identical with is changed to indicate that the parent row is no longer contained in the child version. When a row that is present in a version at a higher level of the version hierarchy is included in a version at a lower level of the hierarchy, child versions 505 is updated in the row belonging to the higher-level version to indicate the fact that the row is included in the lower-level version.

In FIG. 5, live emp_table 403(0) has rows for six employees; these rows appear at 511(0) in emp_table_LT 501. The versions in workspaces 410(1–3) differ from the version in workspace 410(0) in that in the query results for each version, a greater or lesser number of rows are deleted from version 403(0). In pessimistic version 403(1), rows for three employees are deleted; in current level version 403(3), rows for two employees are deleted; in optimistic version 403(5), only 1 row is deleted. Delete flag 507 is used to indicate whether a row is deleted in a given version. Thus, as shown in rows 511(1), pessimistic version 403(1) is specified in table 501 by including a row for each employee whose row is to be deleted. Version number field 503 indicates that these rows have been changed in version 1 and delete flag 507 indicates that the rows have been deleted in that version. Current level version 403(3) is specified in the same way at 511(2), and optimistic version 403(5) is specified at 511(3).

In a preferred embodiment, the views for the workspaces are generated dynamically from a view which appears in built-in objects 515 as emp_table view 518. This view is simply a view of emp_table_LT 501 which does not include the columns that contain version information 502. For a given version v 503, the view (v) for the version v shows the set of rows from <table_name>_LT such that the deleted flag field of the row is 'N' and one of the following holds:
  the row is tagged with version v.
  the row is tagged with a version v' that is at a higher level in the hierarchy than v AND the child version field of the row does not contain a version that is between v' and v in the hierarchy.

To make the result 513 corresponding to pessimistic version 403(1), the database system returns a result which includes all rows of emp_table 518 which correspond to rows of emp_table_LT 501 for which the deleted flag is 'N' and one of the following holds:
  the row is tagged with version 1
  the row is tagged with version 0 and the child version field of the row does not contain the version 1.

Thus, the rows belonging to 511(1. . . 3) are all excluded because their delete flags are set to "Y" and those rows in 511(0) are excluded whose child vers field 505 contains the value "1", leaving the rows whose name fields 405 have the values Finch, Johnson, and Meyers, which is the result shown at 513. The results for the other versions 521 and 523 are produced in the same fashion.

As shown at 515, in addition to emp_table view 518, the versioned relational database system includes auxiliary views 517 for showing conflicting rows on a merge operation, for showing locked rows, for showing differences between two versions, and for simultaneously showing data for multiple versions. The versioned relational database system also includes INSTEAD_OF triggers 519 for transforming insert, update, and delete operations on view 518 into operations on the proper rows of the tables used to generate the query results for the various versions.

Because different versions of a table or set of tables exist simultaneously in a VRDBS, constraint checking is a problem. One way of approaching the problem is to use a pessimistic model for checking a given constraint. If a modification of a row in any version of a VRDBS violates the constraint with regard to a row in any other version of a VRDBS, the modification is not permitted to go forward. The problem with the pessimistic model is of course that the very reason for the existence of the VRDBS is to permit the user to vary the contents of the set of tables, and enforcing constraints according to the pessimistic model makes it too hard for the user to do what he or she wants to do. That is particularly the case if what the user wants to do is make "what if" scenarios. Another way of approaching the problem is to simply not do any checking of the given constraint at all. That solves the ease of use problem, but it also leaves the VRDBS system with no way of preventing rows that violate the given constraint from becoming part of the database. What is needed, and what it is an object of the present invention to provide, is an optimistic constraint checking model: one that interferes much less with the user than the pessimistic model, but is equally able to prevent the entry of data that violates the constraint.

SUMMARY OF THE INVENTION

The object of the invention is achieved by a versioned relational database system in which there is a set of versions of a table and metadata which makes it possible to define a proper subset of the versions of the table that includes those versions in which a constraint violation may occur as a result of an operation on the table that affects a given one of the versions. The versioned relational data base system may then use the metadata to locate rows in the versions of the subset for which the operation may result in a violation of a constraint.

Other aspects of the invention include metadata from which a directed acyclic graph of the versions may be defined. The versions of the subset for a given version belong to an ancestry of the given version that includes the given version and the given version's ancestors in the directed acyclic graph. Further included is metadata for defining a version view in the ancestry of the given version. Each row in the version view has the property that the row both belongs to a version that is in the ancestry of the given version and has a primary key that is the latest version of the primary key in the given version's ancestry. The given version's version view is the rows that must be examined for the given version to determine whether the operation will result in the violation of the constraint.

Further included in the metadata is a view which includes the ancestry of a given version, and a view which computes the latest versions of the primary keys in the table. The constraints with which the foregoing techniques are employed include a relational integrity constraint and a unique key constraint. The techniques further work both with operations that modify a row in a version and with operations that modify the set of constraints associated with the table.

In one type of versioned relational database system, the versioned relational database system includes workspaces that give access to versions in the versioned relational database system and metadata in the relational database system from which a proper subset of the versions may be defined. The subset includes those versions in the set in which a constraint violation may occur as a result of an operation that affects a version that is accessible from a given workspace.

The operation may be a change propagation operation that propagates a change in a version in a first one of the workspaces to a version in a second one of the workspaces. Included in the metadata is metadata from which a directed acyclic graph of the workspaces may be defined. The change propagation operation propagates changes in a version up or down the directed acyclic graph of the workspaces. In the workspace directed acyclic graph, a child workspace may have multiple parents. In that situation, the metadata further defines a multi-parent graph for each child workspace that has multiple parents. The multi-parent graph defines how the change propagation operations propagate changes from or to a child workspace with multiple parents. As such, it also determines what versions must be checked for constraint violations.

Also claimed are optimistic methods of constraint checking and data storage apparatus that stores code which when executed implements apparatus for optimistic constraint checking or methods of optimistic constraint checking.

Other objects and advantages will be apparent to those skilled in the arts to which the invention pertains upon perusal of the following Detailed Description and drawing, wherein:

BRIEF DESCRIPTION OF THE DRAWING

FIG. 1 is a block diagram of a relational database system in which the invention may be implemented;

FIG. 2 shows a hierarchy of workspaces and the versions they contain;

FIG. 6 is a version-enabled table that is referred to in the discussion of FIG. 9;

FIGS. 9, 9A, 9B, 9C, 9D and 9E are a flowchart of RIC constraint checking;

Figure 3:
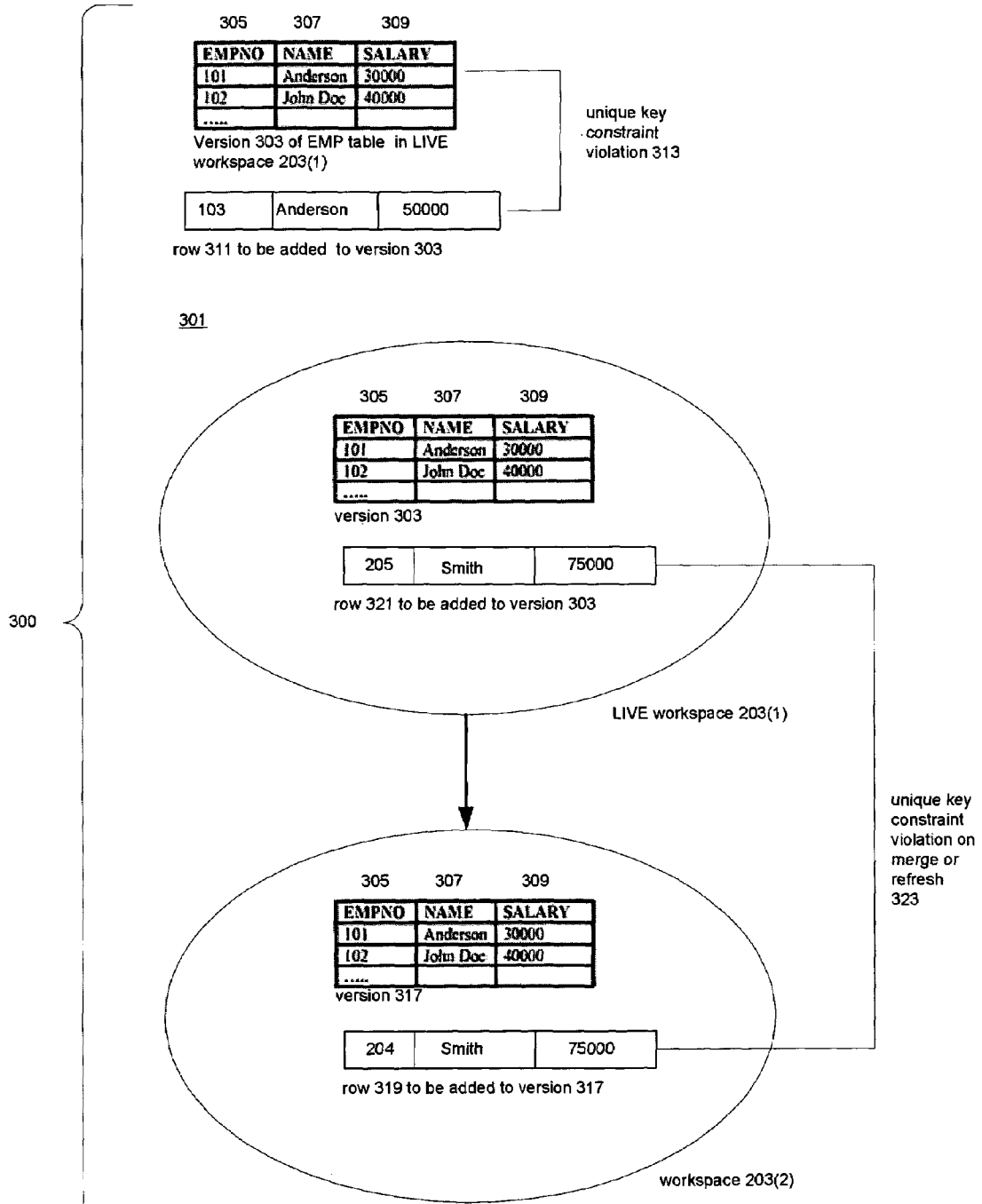
FIG. 3 illustrates constraint violations in a single version and between versions in different workspaces.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will begin with a general discussion of constraint violations and will then provide an overview of an optimistic model for detecting constraint violations and will describe the metadata used to implement the optimistic model. Thereupon, details will be presented of particular optimistic models for detecting unique key constraint violations, RIC violations, and constraint violations in a VRDBS that permits a workspace to have more than one parent.

Integrity Constraints Generally

An integrity constraint is a rule that limits what values may occur in a column of a table or in columns of related tables. The Oracle 8i database system supports integrity constraints including the following:

primary key constraints: these constraints involve a record's primary key, that is, a field in the record that should be unique in the table to which the record belongs and that is used as the record's primary key;

unique key constraints: these constraints involve a unique key in a record, that is, a field in the record which should be unique in the table to which the record belongs, but is not the primary key; and referential integrity constraints: these constraints involve a field in a record whose value is a key to a record in another table.

In a VRDBS, enforcement of constraints generally must take into account the existence of the different versions V of the table T and of the relationships between the workspaces W that provide access to the versions and in which the versions are created. FIG. 3 shows why this is so. Within an ordinary database table, enforcing constraints is straightforward. When a DML operation on a table will produce value in a field which violates a constraint for the table, the operation is not completed. The same rule applies when the DML operation is performed on a current version in a workspace of a versioned relational database system and the operation will produce a value in a field of the current version which violates a constraint for data visible from the version. However, in a versioned relational database system, an operation on a version in a given workspace may result in a value in a field of the given workspace which does not violate any constraint within the given workspace's version, but may potentially violate a constraint with regard to another version. The potential violation can become an actual violation when an operation is performed that causes the value in the field to be propagated to the other version.

FIG. 3 shows both cases at 300. At 301 is shown a unique key constraint violation within the current version 303 for a given workspace of an EMP table. Version 303 has three fields: EMPNO 305, a unique employee number which is the primary key, NAME 307, the employee's name, which is a unique key, and SALARY 309, which is the salary of the employee specified by the record. The record of interest in version 303 is record 101, which has "Anderson" in its NAME field and 30000 in its SALARY field. The person working with version 303 attempts to insert a new row 311 into version 303; the new row has the value "103" in EMPNO and the value "Anderson" in NAME. If this row is inserted, version 303 will have two records with NAME="Anderson". Since NAME is a unique key, insertion of the row will violate the unique key constraint, as shown at 313.

In the second case, shown at 315, a parent workspace, here LIVE workspace 203(1), and a child workspace, here workspace 203(2), are involved. First, a user of workspace 203(2) inserts a row 319 into version 317. Since there is currently no record with "Smith" in its NAME field in version 317 in workspace 203(2), there is no unique key constraint violation. Then a user of LIVE workspace 203(1) inserts a row 321 into version 303; again, there is currently no record with "Smith" in its NAME field in version 303, so there is no constraint violation. However, when workspace 203(2) is refreshed from workspace 203(1) or workspace 203(2) is merged with workspace 203(1), the result is a unique key constraint violation, since the version resulting from the refresh or merger will have two records with NAME="Smith".

Constraints, Version Hierarchies, and Workspace Hierarchies

In order to optimize constraint checking in a VRDBS, it is necessary to determine the rows in the version-enabled table in which a constraint violation may occur as a result of a change in a particular version, since only those rows need be checked for constraint violations. The determination is made using the workspace hierarchy for the workspace in which the version is being changed and the version hierarchy for the version in which the change is being made. The workspace hierarchy determines what versions will actually be changed; the version hierarchy determines the rows in which a constraint violation may occur.

Visibility

The notions of version visible and version view are used to determine rows in which a constraint violation may occur. Version visible is defined as follows: a row R in a version-enabled table that has a primary key K and has the version number for a version V in its ver no field 503 is said to be version visible from a version V' if the following holds:

the version V is in the ancestry of the version V' and
the row R is the latest version of the key K in the ancestry of the version V', where a version's ancestry includes the version itself. Thus, if version V' is version 205(12), version V is any of versions v 205(12), v 205(11), v 205(7), v 205(2), and v 205(1) such that the row R in the version is the latest version of the key K in the ancestry of the version V'.

The latest version of the key K is determined for a given version CV using the query

```
select <Row with key K> from versioned_table
    where version in the set {versions in the ancestry
        of version CV}
    and    child version 505 does not contain any
           version in the set
           {versions in the ancestry of version CV}
```

What the query does is find a version of row R with key K that has a version tag V where V is in the ancestry of the current version CV and was NOT versioned further in another version V' where V' is in the ancestry of the current version CV and V' is a successor version of V. If a row is versioned further, it means that the further versioned row overrides the earlier versioned row. Whether a row gets overridden by a row in a future version is determined solely by the primary key, i.e., rows are chained between versions for given primary keys. The key involved in a particular constraint plays no part in determining what version of a row is to be seen from the current version.

The following provides an example of how rows that are version visible from a given row are determined. The versions 207 in FIG. 2 are taken to be versions of emp_table_LT 501. The example rows are the following:

| emp_id 404 | name 405 | ver no 503 | childver 505 |
|---|---|---|---|
| 1 | Anderson | 205(1) | 205(2) |
| 1 | Smith | 205(2) | −1 (no child) |

Version V' is version 205(4). As shown in hierarchy 207, its ancestors are v 205(4), v 205(2), and v 205(1). As is indicated by the fact that version 205(2) of the row has no children, that version is still present in v 205(4) and the primary key for that row, namely the values of (emp_id 404, ver no 503), or (1,205(2)), is the latest version of the primary key. Consequently, the row with ver no 503=205(2) is the row that is visible to version V' 205(4), while the row with ver no 503=205(1) is not visible to V' even though it is in the ancestry of V'. The reason it is not visible is that the key (1,205(1)) is not the latest version of the primary key.

Using the concept of version-visible rows, we can now define a version view:

Version View(V, T): The Version View for a version-enabled table T from a version V is the set of rows in table T that are version visible from version V.

Again taking emp_table_LT 501 as our example, the version view of emp_table_LT 501 from version 403(1) is the rows of version 403(1) and the corresponding rows of its sole ancestor, version 403(0), since the rows in version 403(1) have primary keys which are the same as those in version 403(0) and are therefore the latest versions of the primary key relative to version 403(1).

The version view can then be used to determine which rows must be checked to determine whether a constraint has been violated. The rows that need to be checked will depend on the version hierarchy, the workspace hierarchy, and the operation that made the constraint check necessary. The constraint version view for a given operation is the set of versioned rows that need to be examined to enforce the constraint for the given operation. In general, the constraint version view for a given operation can be determined as follows:

1. determine the versions that are affected by the given operation; and
2. determine for each affected version the affected version's version view.

Figure 7:
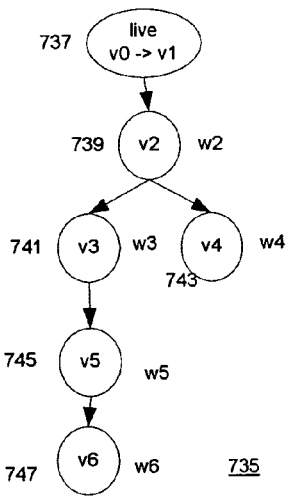
FIG. 7 shows base tables in the metadata used to compute a workspace and version hierarchies.

Metadata for Checking Constraint Violations in a VRDBS: FIG. 7

The problem in checking constraint violations in a VRDBS is having the versions in the constraint version view readily available for checking. To do this, the preferred embodiment defines a few views that compute the list of the constraint version view. The views use the base tables shown at 701 in FIG. 7.

The values in the fields of the tables of FIG. 7 relate to the hierarchy of workspaces shown at 735 in FIG. 7. In that graph, the versions of the version-enabled table are indicated by v# in the centers of the nodes, while the workspaces are indicated by w# to the left or right of the nodes; thus node 741 represents workspace 2, as indicated by "w2", and workspace w2 contains the third version of the version-enabled table, as indicated by "v2".

Beginning with wm$ancestor_workspaces_table 703, table 703 is part of the metadata for the version-enabled tables described in the Description of related art. Each workspace in graph 735 but LIVE workspace 737 has at least one ancestor, and there is an entry for each ancestor in table 703. There are three columns in the table: workspaces 705, ancestor workspaces 707, and ancestor versions 709. Each workspace that has an ancestor has a row in table 703, with the workspace being specified in column 705. In the workspace's row, the value of the field in column 707 specifies an ancestor workspace of the workspace specified in col. 705 and the value of the field in column 709 specifies the current version of the table in the ancestor workspace.

Relationships between table versions in the workspaces are recorded in wm$version_hierarchy_table 733. Each row has three fields, field 735 identifying a version, field 737 identifying a parent version for the version in field 735, and field 739 identifying the workspace to which the version specified in field 735 belongs. The parent version is the version from which version 735 was originally copied. Thus, in table 733, v0 is in the LIVE workspace and has no parent, so field 737 has a null value and field 739 specifies the LIVE workspace, while v1, which is also in the LIVE workspace but has as its parent v0, has v0 in field 737 and LIVE in field 739.

The foregoing tables are further used in the creation of the constraint version view: wm$current_parent_versions_view, which is produced by a join of wm_ancestor_workspaces_table 703 and wm$version_hierarchy_table 733:

```
create view wm$current_parent_versions_view as
    select vht.version from
        wmsys.wm$version_hierarchy_table vht,
        wmsys.wm$ancestor_workspaces_table awt
    where awt.workspace = SYSTEM_CONTEXT('CURRENT_
WORKSPACE')
        and vht.workspace = awt.anc_workspace
        and vht.version <= awt.anc_version
union all
select version from wmsys.wm$version_hierarchy_table
    where workspace = SYSTEM_CONTEXT('CURRENT_
        WORKSPACE');
```

This view is used to present the latest versions of each primary key relative to CURRENT_WORKSPACE.

Optimistic Enforcement of Unique Key Constraints in a VRDBS: FIG. 3

Like other relational database systems, the Oracle 8i system defines a unique key constraint for a table as follows: A unique key integrity constraint on a set of columns (key) in a table T requires that every value in the column or set of columns (key) or a function applied to the key be unique; that is, no two rows of the table T have duplicate values in the specified key column(s) or in the return values of the specified function (for a functional constraint) on the key columns.

The following definitions are useful in understanding unique key constraints in VRDBS's:

Version Unique: A set of columns in a version-enabled table T are said to be Version Unique with respect to version V if no two rows of the Version View (V, T) have duplicate values for those columns.

Workspace Unique(W): A set of columns in a version-enabled table T are said to be Workspace Unique with respect to workspace W if the set of columns are version unique with respect to the linear set of versions that are accessible via the workspace W.

Using the above terminology, an optimistic unique key constraint can be defined as follows:

A unique key integrity constraint on a set of columns (key) in a version-enabled table T requires that the key columns be Workspace Unique with respect to every workspace in the versioning system; that is, there is no workspace in the versioning system whose version has a version view such that that there are duplicate values in the specified key column(s) or in the return values of the specified function (for a functional constraint) on the key columns in the rows that are visible in the version view.

The rows that need to be actually examined to determine whether the key columns are Workspace Unique are determined by the constraint version views for the particular operations and the unique key constraint. These constraint version views are set forth in the following:

DML Operation: When a DML operation is performed in a workspace W, the unique key constraint is enforced using a constraint version view which is the Version view of the current version in the workspace W. Additionally, if the workspace W has any continually refreshed workspaces as descendants, then this DML operation can result in a continual refresh change propagation. In such a case, the unique key constraint for the continual refresh change propagation is enforced as follows:

Continual refresh: When a change is made in a workspace W that has to be propagated to a continually refreshed descendant workspace CW, the unique key constraint is enforced using a constraint version view which is the Version view from the current version in the CR workspace CW.

Explicit refresh: When a workspace W with parent workspace PW is refreshed, the unique key constraint is enforced using a constraint version view which is the Version view of the current version of the workspace W.

Explicit merge: When a workspace W with parent workspace PW is merged, the unique key constraint is enforced using a constraint version view which is the Version view of the current version in the workspace PW, the parent workspace of the workspace W.

The constraint check is performed when the explicit refresh or merge operation is performed.

Figure 13:
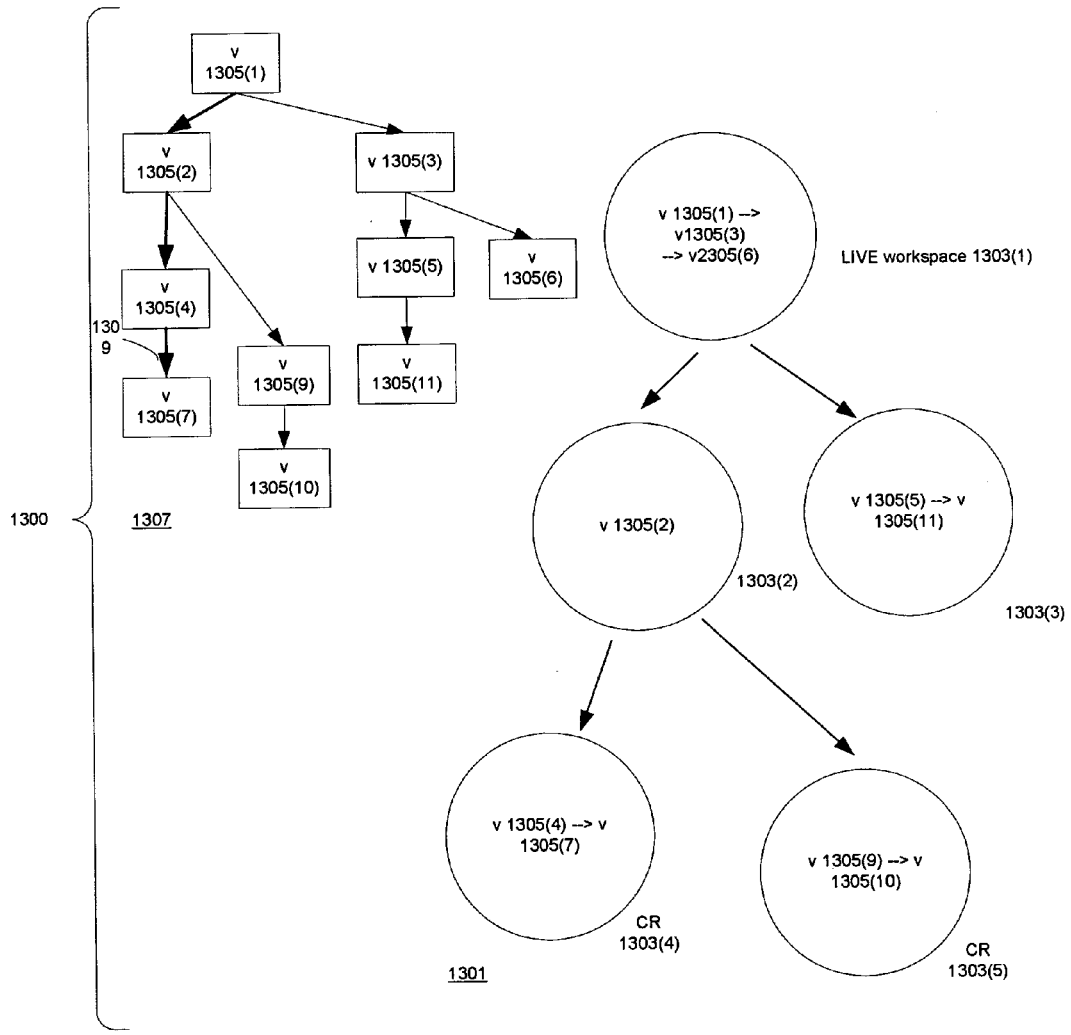
FIG. 13 shows a hierarchy of workspaces and a hierarchy of versions in which some of the workspaces are CR workspaces.

FIGS. 2 and 13 provide illustrations. FIG. 2 shows a workspace hierarchy 201 in which none of the workspaces have been specifies as being continually refreshed. FIG. 13 shows at 1300 an equivalent workspace hierarchy 1301 in which workspaces 1303(2) and 1303(3) have been specified as being continually refreshed, as well as version hierarchy 1307 for the workspaces 1301.

The change propagation operations and their constraint version views for the various workspaces are the following, beginning with workspace hierarchy 201, in which there are no CR workspaces.

Live workspace 203(1)
  explicit refresh to workspace 203(3): rows in v 205(13) and its ancestry v 205(5), v 205(3), and v 205(1)
  merge: not possible, since LIVE workspace 603(0) has no parent.

Workspace 203(4)
  continual refresh: not created as a CR workspace; no CR possible
  explicit refresh from workspace 203(2): rows in v 205(10)'s ancestry: v205(10), v 205(8), v 205(4), v 205(2), and v 205(1).
  merge to workspace 203(2): rows in v 205(9)'s ancestry: v205(9), v205(7), v205(4) v 205(2) and v 205 (1).

Continuing with workspace hierarchy 1301, it should be remembered that when a given workspace as a CR descendant, creation of a new workspace from the given workspace does not result in the creation of a new current version in the given workspace.

Live workspace 1303(1): Continual refresh: the version view for the current version in each of the workspaces 1303(1,2, and 3). The version view for the current version 1303(9) in workspace 1303(2) may include rows in the ancestry of version 1305(9), namely v 1305(9), v 1305(7), v 1305(4), v 1305(2), and v 1305 (1).

The chief views used in detecting violations of the unique key constraint are:

1. Ancestor Versions View: View that computes all the ancestor versions of the version in the current workspace:

```
create or replace view wm$current_parent_versions_view
    as
        select vht.version from
            wm$version_hierarchy_table vht,
            wm$ancestor_workspaces_table awt
        where awt.workspace =
            SYSTEM_CONTEXT('CURRENT_WORKSPACE')
            and
                vht.workspace = awt.anc_workspace and
                vht.version <= awt.anc_version
    union all
    select version
    from wm$version_hierarchy_table
    where workspace =
        SYSTEM_CONTEXT('CURRENT_WORKSPACE') ;
WITH READ ONLY ;
```

2. CR Child Versions View: View that computes all the CR child workspace versions (if any) of the current workspace:

```
create or replace view wm$current_child_versions_view
    as
        select vht.version from
            wm$version_hierarchy_table vht,
            wm$version_table vt
        where
            (
            vht.workspace = vt.workspace and
            vt.anc_workspace =
                SYSTEM_CONTEXT('CURRENT_
                WORKSPACE') and
            vt.anc_version =
                SYSTEM_CONTEXT('CURRENT_VERSION')
            )
WITH READ ONLY ;
```

3. All Constraint Versions View: View that computes all the versions that have to be looked up to validate a unique key constraint check. This list of versions includes all the ancestor versions of the current version AND also the versions from all CR child workspaces (if any). This view is a union of all the versions in the current workspace's ancestry (Ancestor_Versions_View) and all the versions from all the CR child workspaces (if any) (CR_Child_Versions_View).

```
create or replace view wm$current_cons_versions_view
    as
    select version from wm$current_child_versions_view
    union all
    select parent_vers from wm$current_parvers_view
    WITH READ ONLY ;
```

In addition, the VRDBS creates a view that is specific to a particular version-enabled table i.e. this view is created when a table is version-enabled and is used for the enforcement of unique key constraints for that particular table in conjunction with the generic metadata views described above. For example, when the table EMP is version-enabled, a view EMP_CONS is created. This view computes the most recent versions of rows that are tagged with versions in the All_Constraint_Versions_View list.

```
CREATE OR REPLACE VIEW EMP_CONS
    AS
    SELECT lt.*, lt.rowid rid FROM
        EMP_LT lt
    WHERE
        version IN (select version from
            wm$current_cons_versions_view) and
        < ROW IS THE MOST RECENT VERSION IN THE
        Ancestor_Versions_view >
WITH READ ONLY
```

All the previously described views are used by the preferred embodiment to enforce unique key constraints in conjunction with various operations performed by the VRDBS on the version-enabled table and its versions.

A non-versioned table having a Unique Key Constraint defined on some column(s) has either a unique index or a non-unique index on these columns. This index is necessary to enforce the Unique Key Constraint efficiently. After the table is version-enabled, the following operation is performed on the table:

If the table has a non-unique index on the Unique Key columns, then that index is kept as it is.

If the table has a unique index on the Unique Key columns, then that index is dropped and a non-unique index is created on the same columns. This is necessary because in a Versioned RDBMS, duplicate rows of same Unique Key value might exist if the same record is edited in many versions.

Unique key Constraint Enforcement

Unique key constraint enforcement is done in the following cases:

When a DML operation is performed in a workspace when a DML operation performed in a workspace results in a continual refresh;

when a user performs a refresh operation on a workspace;

when a user performs a merge operation on a workspace; and when a user performs a DDL operation that adds a unique key constraint to a version-enabled table.

To determine whether a unique key constraint violation has occurred, the system checks the versions belonging to the constraint version view for the version being changed by the operation. If the set of records belonging to the versions in the constraint version view includes two records with the same unique key, then the unique key constraint has been violated. The versions belonging to the constraint version view are indicated in the EMP_CONS view described above.

Unique Key Constraint Checks Performed During a DML Operation

When a DML operation—an UPDATE or an INSERT (nothing needs to be done with regard to unique key constraints for deletes) is performed in a workspace W, the VRDBS of the preferred embodiment uses instead-of triggers in the DML operation to determine whether the result of the DML operation will violate the unique key constraint for the workspace W. In addition, if the DML operation results in the change being propagated to a continually refreshed descendant workspace of the workspace W, the VRDBS of the preferred embodiment also checks to see if the change will violate the unique key constraint for any of those descendant workspaces. Both the above checks are done from the instead-of trigger using the <table_name>_CONS view described in the previous section. The snippets of code that do this for a version-enabled table EMP with a unique key constraint on the NAME column are shown below for the INSERT and UPDATE operations. In this code, :NEW.NAME is the value of the NAME column that was passed in during the DML operation.

Insert:

```
/* Begin Unique key constraint check */
IF(:NEW.NAME is null) THEN
    NULL;
ELSE
    SELECT count(*) INTO existRows
    FROM EMP_CONS
    WHERE delstatus > 0 and
        NAME = :NEW.NAME
/* If we found some rows, we have a unique key constraint
violation */
    IF (existRows > 0) then
        SYS.WM_ERROR.RAISEERROR
            ('UNIQUE CONSTRAINT VIOLATED');
    END IF;
END IF;
```

Update:

```
/* Begin Unique key constraint check */
IF(:NEW.NAME is null) THEN
    NULL;
ELSE
    SELECT count(*) INTO existRows
    FROM EMP_CONS
    WHERE delstatus > 0 AND
        NAME = :NEW.NAME AND
        ROWID != :NEW.ROWID)
/* If we found some rows, we have a unique key constraint
violation */
    IF (existRows > 0) then
        SYS.WM_ERROR.RAISEERROR
            ('UNIQUE CONSTRAINT VIOLATED');
    END IF;
END IF;
```

The only difference in the Insert and Update triggers is the additional check that is done in the update trigger to ensure that the unique key constraint is violated only if we find a row that is different from the one we are currently updating with the same unique key constraint column values.

Workspace Operation Checks

When a merge or an explicit refresh operation is executed, the VRDBS of the preferred environment ensures that the new rows being copied from the child to parent (or vice versa) do not result in any unique key constraint violations. The checks that are performed during a merge and a refresh operation are described below.

Merge:

During the merge of a workspace W to its parent, the preferred embodiment enforces unique key constraints for a version-enabled table T by checking to see if any of the rows that the merge operation will copy from the version in the child workspace to the version in the parent workspace will cause a unique key constraint violation. So the preferred embodiment considers each row to be copied to the parent workspace's current version in turn. In considering a row, it uses the <table_name>_CONS view to check if there exists some other row in the constraint version view for the parent workspace's current version that has the same values in the unique key constraint columns as the row being merged.

The code that enforces the unique key constraint for the version-enabled EMP table is as follows:

```
select count(*) from
    (select EMPNO,NAME from EMP_LT lt
    where version = <PARENT_WORKSPACE_VERSION>
    AND
    EMPNO in <KEYS_MODIFIED_IN_WORKPSACE_BEING_
    MERGED>
    AND
    deleted = 'NO'
    ) v1,
    (select EMPNO,NAME,delstatus,version,nextver
        from EMP_CONS.NAME
    where V2.delstatus > 0
        AND
        (v1.NAME = V2.NAME)
        AND
        (v1.EMPNO != V2.EMPNO)
```

Refresh:

During the explicit refresh of a workspace W from its parent, the preferred embodiment enforces unique key constraints for a version-enabled table T by checking to see if any of the rows that the refresh operation will copy from the version in the parent workspace to the version in the child workspace in the refresh will cause a unique key constraint violation. So the preferred embodiment considers each row being copied to the current version in the child workspace as part of the refresh in turn; for each row, it uses the <table_name>_CONS view to check if there exists some other row in the constraint version view for the child workspace's current version that has the same values for the unique key constraint columns as the row being refreshed.

The code that enforces the unique key constraint for the version-enabled EMP table is as follows:

```
select count(*) from
    (select EMPNO,NAME from EMP_LT lt
    where <LATEST_VERSION_OF_ROWS_FROM_PARENT_
        WORKSPACE_
            OF_WORKSPACE_BEING_REFRESHED>
    ) v1
    (select EMPNO,NAME,delstatus,version,nextver
    from EMP_CONS) NAME
    where V2.delstatus > 0 AND
        (v1.NANE = V2.NAME) AND
        (v1.EMPNO != V2.EMPNO)
```

DDL Checks

In the preferred embodiment, a standard data definition language (DDL) is used to modify the form of a table. DDL may be used to modify version-enabled tables. Among the modifications which DDL can specify for a version-enabled table is the definition of a new unique key constraint for an existing version-enabled table. When the DDL specifying a new unique key constraint is executed, the preferred embodiment checks the rows of the version-enabled table as it exists as of the time the constraint is added to make sure that the table does not contain rows that will violate the new unique key constraint.

In performing the constraint check for the DDL operation, the preferred embodiment considers all versions of all rows from the <table_name>_LT table; For each of these rows R tagged with version V, it checks to see if there exists a version of a row (with a different primary key), which has the same unique key constraint column values as that of the row R; If such a row R' tagged with a version V' exists, then the preferred embodiment checks whether the version of the row R (V) is in the version ancestry of the version of the row R' (V') and that the row R is the latest version of the row as seen from version V'. If such a pair is found, the preferred embodiment flags a unique key constraint violation. The constraint version view here is every version of the table and for each of the versions, its version view.

The actual check performed on execution of a DDL operation that adds a unique key constraint on the NAME column of the version-enabled EMP table is as follows:

```
select count(*)
from    EMP_LT t1,EMP_LT t2
where   t1.NAME = t2.NAME           AND
        t1.EMPNO != t2.EMPNO        AND
        t1.deleted = 'NO'           AND
        t2.deleted = 'NO'           AND
        t2.version in
        <ANCESTOR_VERSIONS_OF_T1.VERSION> AND
        t2.version is
        <LATEST_VERSION_OF_ROW_AS_SEEN_
        FROM_T1.VERSION>
```

RIC constraint checking in a VRDBS: FIGS. 6, 9–12

The following material is from the parent of the present patent application, U.S. Ser. No. 09/557,592, Ramkrishna Chatterjee, et al., System and method for enforcing referential constraints between versioned database tables, filed Apr. 22, 2000. It discloses a technique that takes into account the workspace in which a change is being made and the version hierarchy for the version in which the change is being made to determine which rows of the version-enabled table are to be checked for constraint violations.

Version control subsystem 11 (FIG. 10) facilitates versioning of the database 13 on a table-by-table basis. That is, a user can enable the version control subsystem 11 to allow for versioning of one or more of the database tables as described above and contemporaneously not allow for versioning of other database tables. In that connection, a problem can arise if, for example, one database table includes information that is also referenced in another database table. Using the above example, in which a database table 13n is an employee database table (detail in FIG. 6), with the records identifying the names, employee numbers, addresses, departments, etc., for the respective employees, the database 13 may also have a company structure database table 13n' that identifies the company's departments. In that case, it may be undesirable to allow a user to, for example, delete a row of the database table 13n' that identifies a department for that there is at least one employee in the database table 13n. In that case, if a user wishes to delete a row associated with one department in the database table 13n', he or she would need to update all of the records in the database table 13n to either change the department identified in those records before the row could be deleted, or to delete those records. This may be useful if, for example, the departmental structure of the company is being modified. Alternatively, the user would need to authorize the DBMS 12 to delete all of the records of the employee database 13n that identify the department record that is being deleted in company structure database table 13n'; this may be useful if, for example, the department is being eliminated and the employees discharged. This serves to ensure referential integrity as between the database tables 13n and 13n'.

Several problems arise, however, if the version control subsystem 11 is versioning one or more of the database tables 13n in the database 13. Generally, a problem will not arise if the version control subsystem 11 is not versioning either of a pair of database tables for which a referential integrity constraint exists. Neither will a problem arise if the version control subsystem 11 has versioned, for example, one of the database tables for that a referential integrity constraint exists but not the other such tables. Referring to the example in the preceding paragraph, if, for example, the employee database table 13n has been versioned, but the company structure database table 13n' has not been versioned, if a user wishes to delete a row from the company structure database table 13n' associated with a department, operations as described above can be performed in connection with all of the versions contained in the employee database table 13.

On the other hand, if the version control subsystem 11 has versioned both the employee database table 13n and the company structure database table 13n', since the version structure of the employee database table 13n, as represented by its version tree, need have no relation to the version structure in the company structure database table 13n', and if the same department was identified in two or more versions in the company structure database table 13n', deleting a row associated with one version would delete the department for that version but not for other versions. Accordingly, if the row associated with a department is deleted in one version of the company structure database table 13n', it would be undesirable to, for example, delete the rows of the employee database table 13n for employees whose records relating to that department, since the department may still exist in rows of other versions of the company structure database table 13n'. Similar operations are performed in connection with any type of query that is subject to a referential integrity constraint.

In the following, two tables 13n and 13n' will be considered to have a parent and child referential integrity constraint relationship if, for child table 13n, the value(s) that are contained in a particular field 21(j) of its rows 20(i) must correspond to the value contained in a particular field 21(j') in at least one row 20(i') of the parent table 13n'. In addition, the referential integrity constraint relationship will be considered a "foreign key" relationship if the field 21(j') in the parent table 13n' is a key field in the parent table 13n', and in that case the "j-th" field of the child table 13n will be referred to as the foreign key field.

Figure 9:
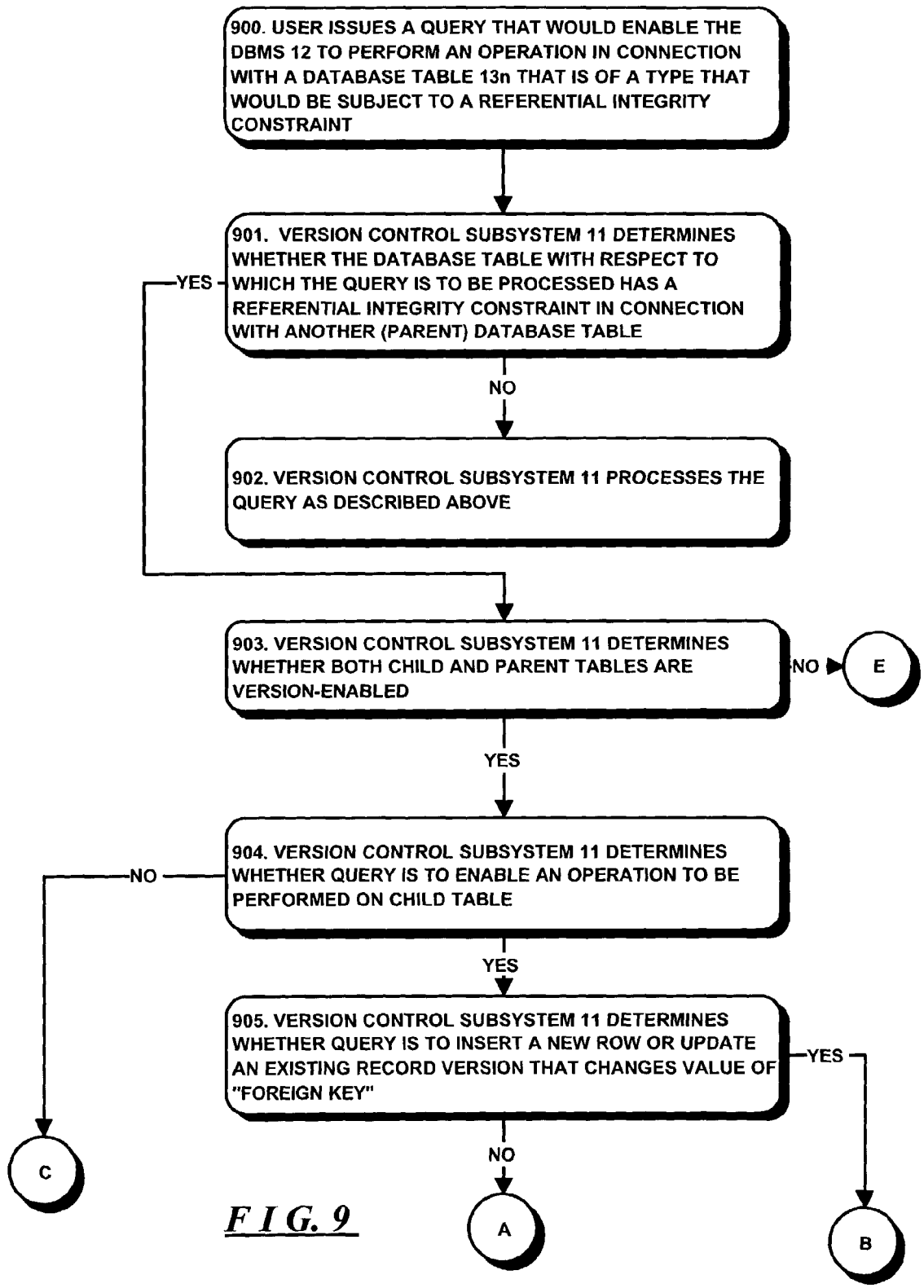

Accordingly, with this background, operations performed by the version control subsystem 11 in connection with enforcement of a referential integrity constraint will be described in connection with FIG. 9. With reference to FIG. 9, when the user issues a query that would enable the DBMS 12 to perform an operation in connection with a database table 13n that is of a type that would be subject to a referential integrity constraint (step 900), the version control subsystem 11 initially determines whether the database table with respect to which the query is to be processed has a referential integrity constraint in connection with another database table (step 901). If the version control subsystem 11 makes a negative determination in step 901, the version control subsystem 11 will process the query as described above (step 902).

On the other hand, if the version control subsystem 11 makes a positive determination in step 901, which will be the case if the database table with respect to that the query is to be processed has a referential integrity constraint in connection with another database table, the version control subsystem will determine whether both database tables are versioned (step 903). If the version control subsystem 11 makes a positive determination in step 903, the version control subsystem 11 will determine whether the query is to enable an operation to be performed on the child table. If the version control subsystem 11 makes a positive determination in step 904, it determines whether the query is to insert a new row in the child table, or to update an existing record version in a manner which would change the value of a foreign key, that is, data in a field that is referenced from the parent table (step 905). If the version control subsystem 11 makes a negative determination in step 905, no problem will result if the operation to be enabled by the query is performed, and so the version control subsystem 11 generates one or more augmented queries as necessary to enable the operation to be performed, and provides them to the DBMS for processing (step 906).

Figure 12:
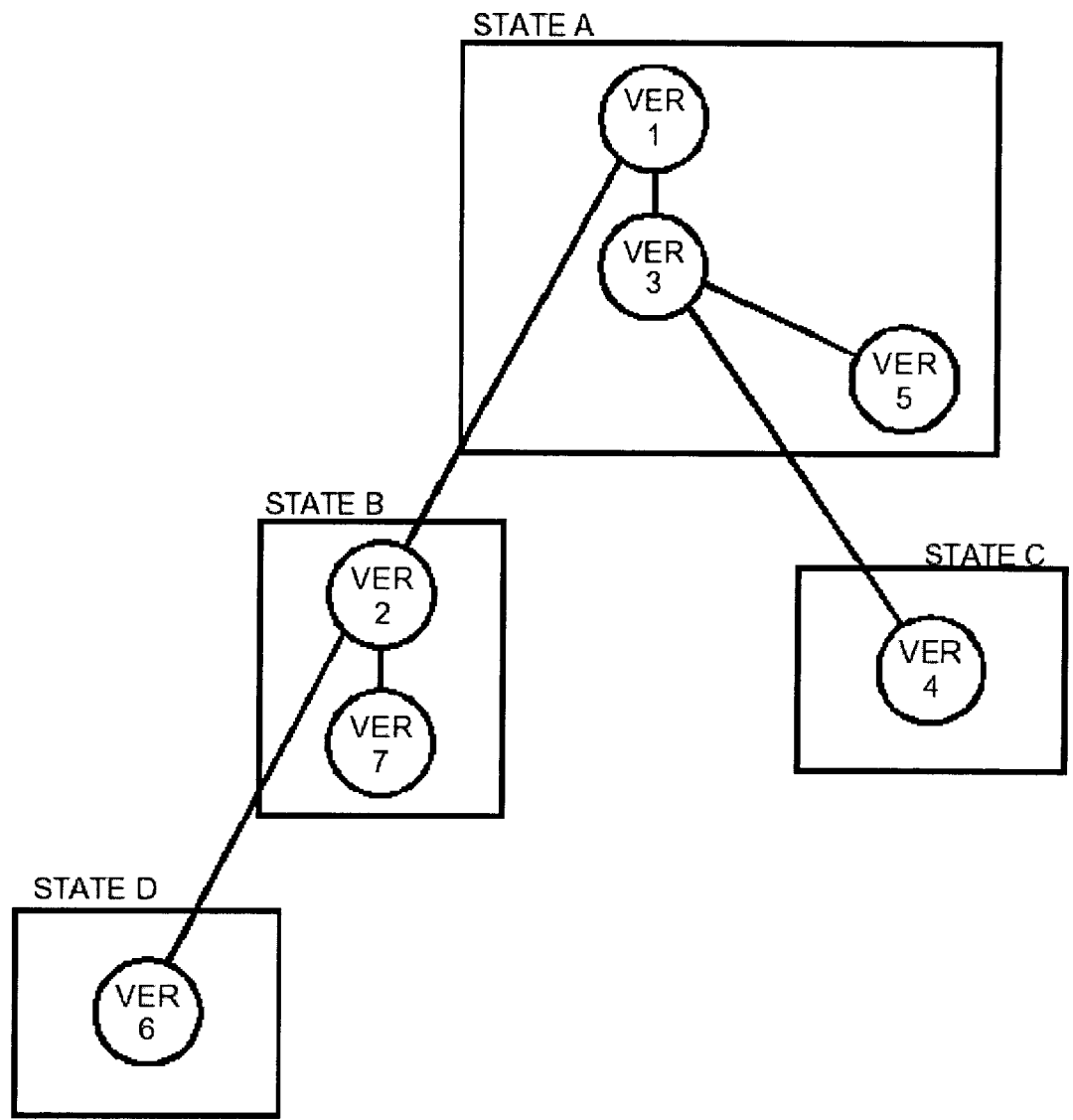
FIG. 12 shows a hierarchy of workspaces and a hierarchy of versions that is referred to in the discussion of FIG. 9.

Returning to step 905, if the version control subsystem 11 makes a positive determination in that step, a problem can arise since it will need to ensure that the parent table contains a record version, in the version for which the row is to be inserted or updated in the child table, that is in the version hierarchy that contains the foreign key. That is, with reference to FIG. 12, if the query is for state B, the version control subsystem 11 will need to verify that, in the set of versions of parent table 13*n*' in root state A and state B, one record version contains the value to be provided in the foreign key field of the child table 13*n*. Thus, for example, if both the parent database table 13*n*' and the child database table 13*n* have version hierarchies as shown in FIG. 12, and if the user wishes to insert a new record version in the version associated with state B of the child table, or update an existing record version so as to change the value of the foreign key field, version control subsystem 11 will need to ensure that the value of the foreign key field is also in a record version that is in at least one of the versions associated with versions 7, 2, or 1 of the parent table 13*n*', that is, the version hierarchy of the last version of parent table 13*n*' in state B. Accordingly, the version control subsystem 11 will generate one or more queries for processing by the DBMS to enable it to make that determination (step 907). If the version control subsystem 11 makes a negative determination in step 907, it will reject the query (step 908). On the other hand, if the version control subsystem 11 makes a positive determination in step 907, it will generate one or more augmented queries to enable the operation specified in the query received in step 900 to be performed, and provides them to the DBMS 12 for processing (step 909).

Returning to step 904, if the version control subsystem 11 makes a negative determination in that step, which will occur if the query received in step 900 is to enable an operation to be performed in connection with the parent table 13*n*', the version control subsystem 11 will determine whether the query is to enable deletion of a record version from the parent table 13*n*' that contains, in a user data field 210'), a value that operates as a referential constraint in a child table 13*n* (that is, a value that is in one or more record versions in the child table 13(*n*) in respective user data fields 21(*j*) for which the value must also be in the field 21(*j*') of the record version in the parent table 13*n*'), or if the query is to enable a cascade delete operation to occur (step 910).

In that case, if the version control subsystem 11 makes a positive determination in step 910, it will generate one or more augmented queries to enable the DBMS 12 to delete the records in the child table 13*n* that are dependent on the record version in the parent table that is to be deleted, and provides them to the DBMS 12 for processing (step 911). Thereafter, the version control subsystem 11 generates one or more augmented queries to enable the DBMS to delete the record version in the parent table and provides them to the DBMS 12 for processing (step 912).

Returning to step 910, if the version control subsystem 11 makes a negative determination in that step, it sequences to step 913 to determine whether the query received in step 900 is to enable a restricted delete or an update of a record in a version in the parent table 13*n*'. If the version control subsystem 11 makes a negative determination in step 913, which may occur if, for example, the query is to enable a new record to be inserted in a version in the parent table, it generates one or more augmented queries as necessary to enable the operation to be performed an provides them to the DBMS 12 for processing (step 914).

Returning to step 913, if the version control subsystem 11 makes a positive determination in that step, determines whether there are any records in the child table 13*n* that depend on the record version in the parent table 13*n*' that is to be deleted (step 915). In that operation, the version control subsystem 11 will generate one or more queries to query the DBMS as to whether such records exist for processing by the DBMS. If the version control subsystem 11 determines that such a record exists, it rejects the query (step 916). On the other hand, if the version control subsystem 11 determines that no such records exist, it generates one or more augmented queries as necessary to enable the operation specified in the query received in step 900 to be performed, and provides them to the DBMS 12 for processing.

Returning to step 903, if the version control subsystem 11 makes a negative determination in that step, which will be the case if the parent and child tables are not both version-enabled, it will sequence to step 920 to determine whether the child version is version-enabled, but the parent table is not. In that case, the records in the parent table are effectively in every version represented by the record versions in the child table. If the version control subsystem 11 makes a positive determination in that step, the version control subsystem 11 determines whether the operation to be performed in response to the query received in step 900 is to be performed in connection with the child table (step 921). If the version control subsystem 11 makes a negative determination in step 921, which will be the case if the operation is to be performed in connection with the parent table, it sequences to step 910 to perform the operations described above in connection with steps 910 through 917 in connection with the parent table.

On the other hand, if the version control subsystem 11 makes a positive determination in step 921, which will be the case if the operation is to be performed in connection with the child table, the version control subsystem 11 it determines whether the query is to insert a new row in the child table, or to update an existing record version in a manner which would change the value of a foreign key, that is, data which is referenced from the parent table (step 922). If the version control subsystem 11 makes a negative determination in step 922, the version control subsystem 11 generates one or more augmented queries as necessary to enable the operation to be performed, and provides them to the DBMS for processing (step 923).

Returning to step 922, if the version control subsystem 11 makes a positive determination in that step, it will determine whether a corresponding record exists in the parent table by generating one or more queries for processing by the DBMS to enable it to make that determination (step 924). If the version control subsystem 11 makes a negative determination in step 924, it will reject the query (step 925). On the other hand, if the version control subsystem 11 makes a positive determination in step 924, it will generate one or more augmented queries to enable the operation specified in the query received in step 900 to be performed, and provides them to the DBMS 12 for processing (step 926). It will be appreciated that the operations performed in connection with steps 922 through 926 are analogous to the operations performed in connection with steps 905 through 909, except that in step 924 (which corresponds to step 907), the determination is made only in relation to the single version in the parent table.

Returning to step 920, if the version control subsystem 11 makes a negative determination in that step, which will be the case if neither the parent table nor the child table is version enabled, the version control subsystem 11 will sequence to step 927 to generate one or more augmented queries to enable the operation specified in the query received in step 900 to be performed, and provides them to the DBMS 12 for processing.

Figure 9A:
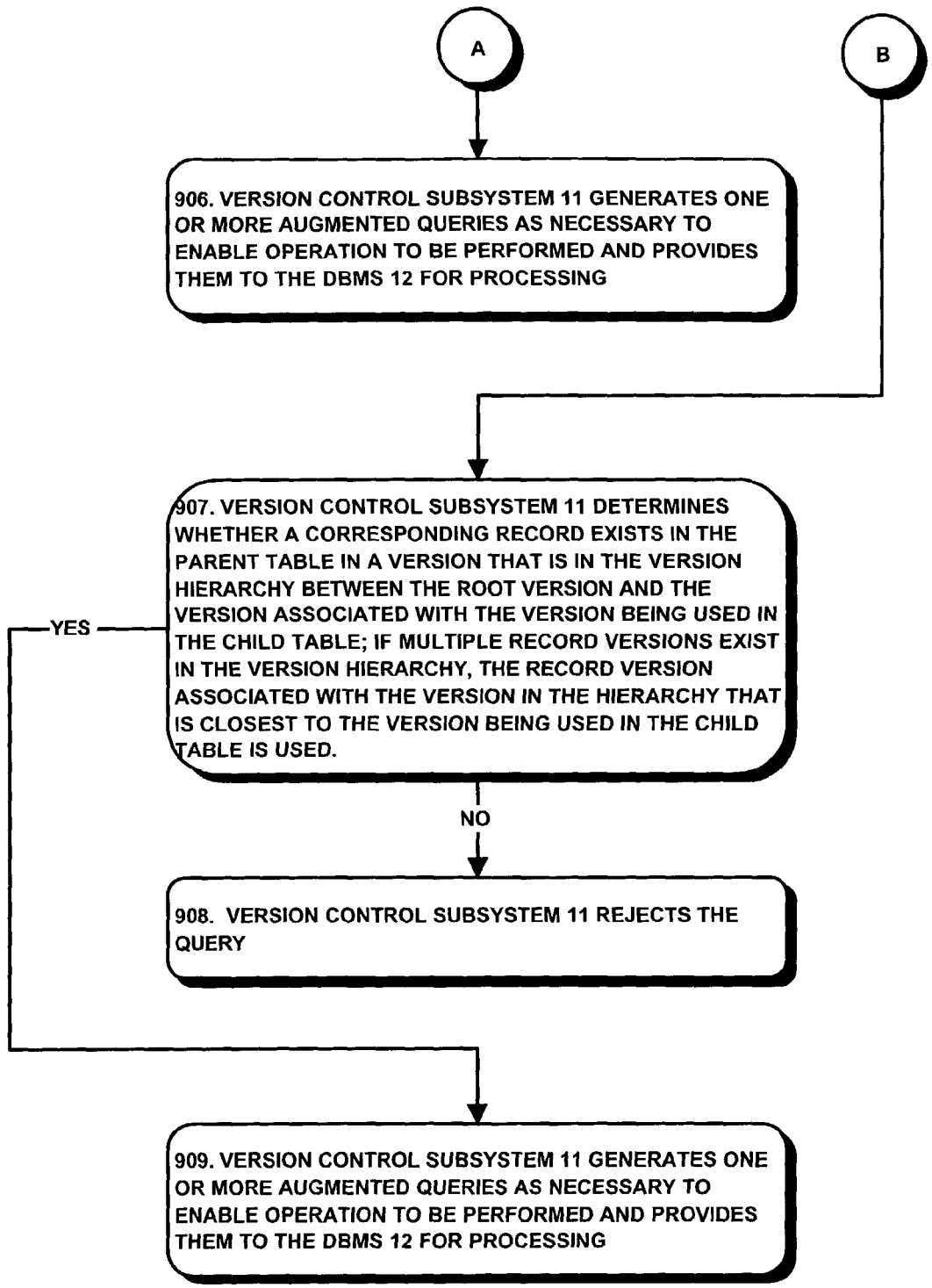
Figure 9B:
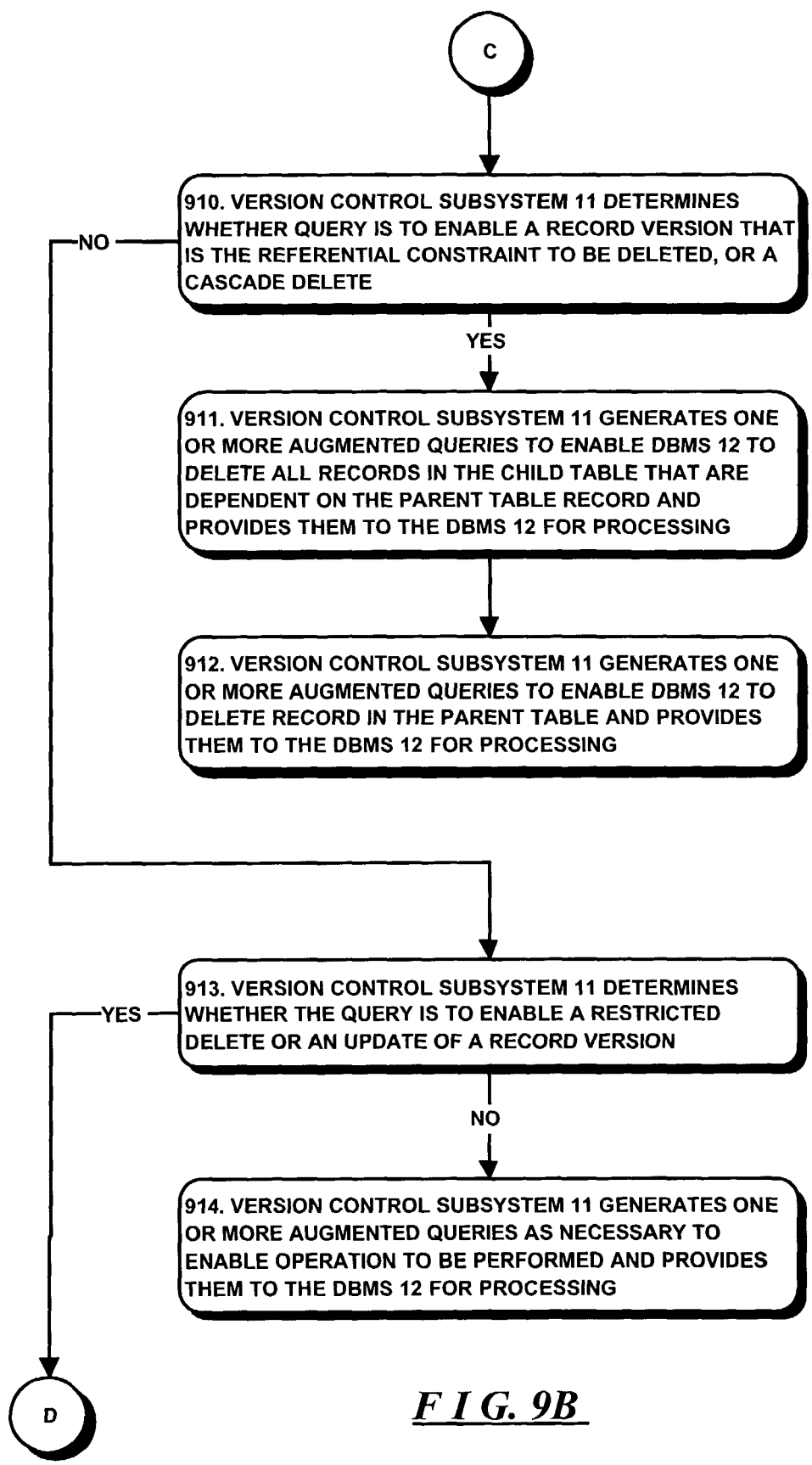
Figure 9C:
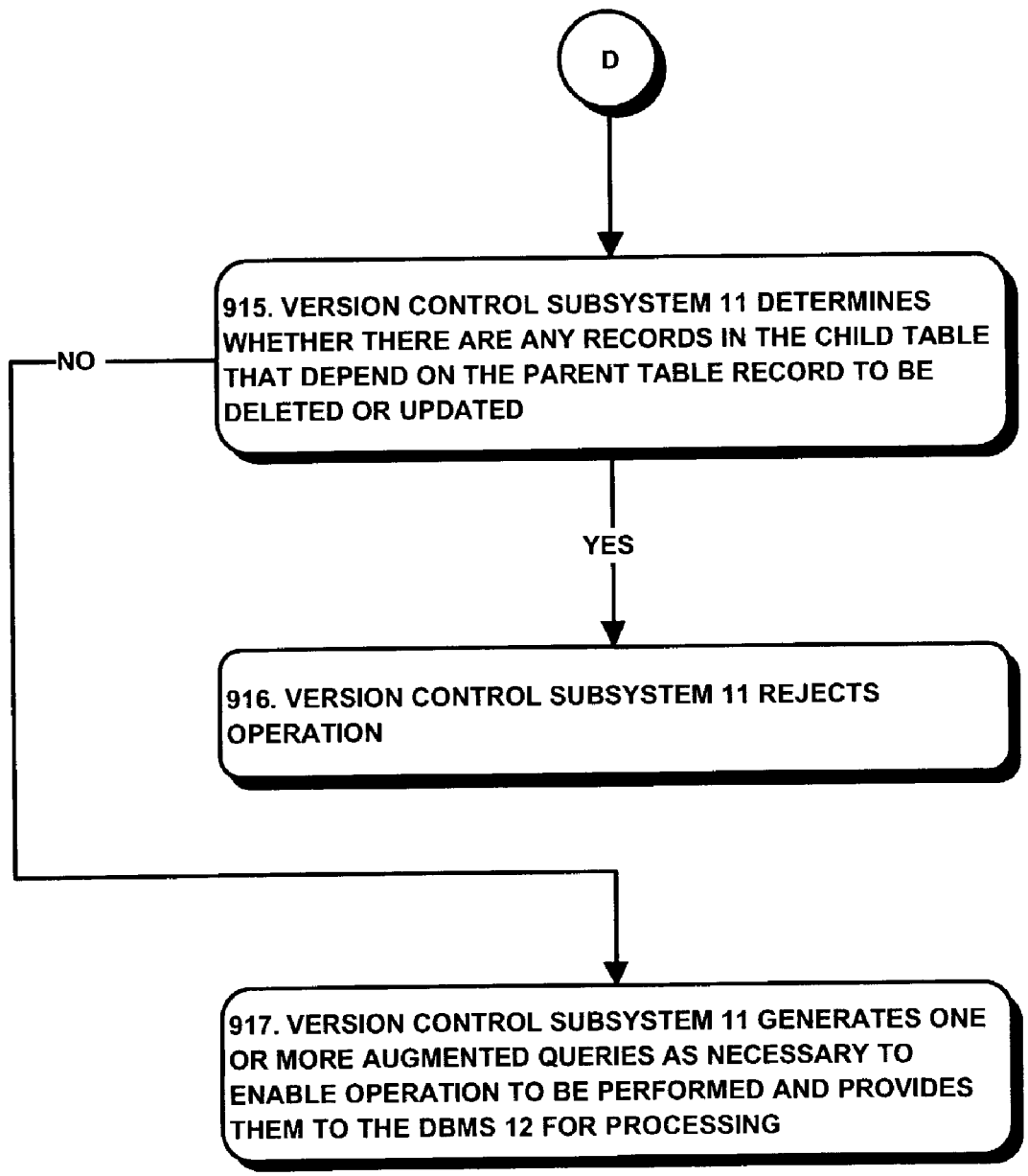
Figure 9E:
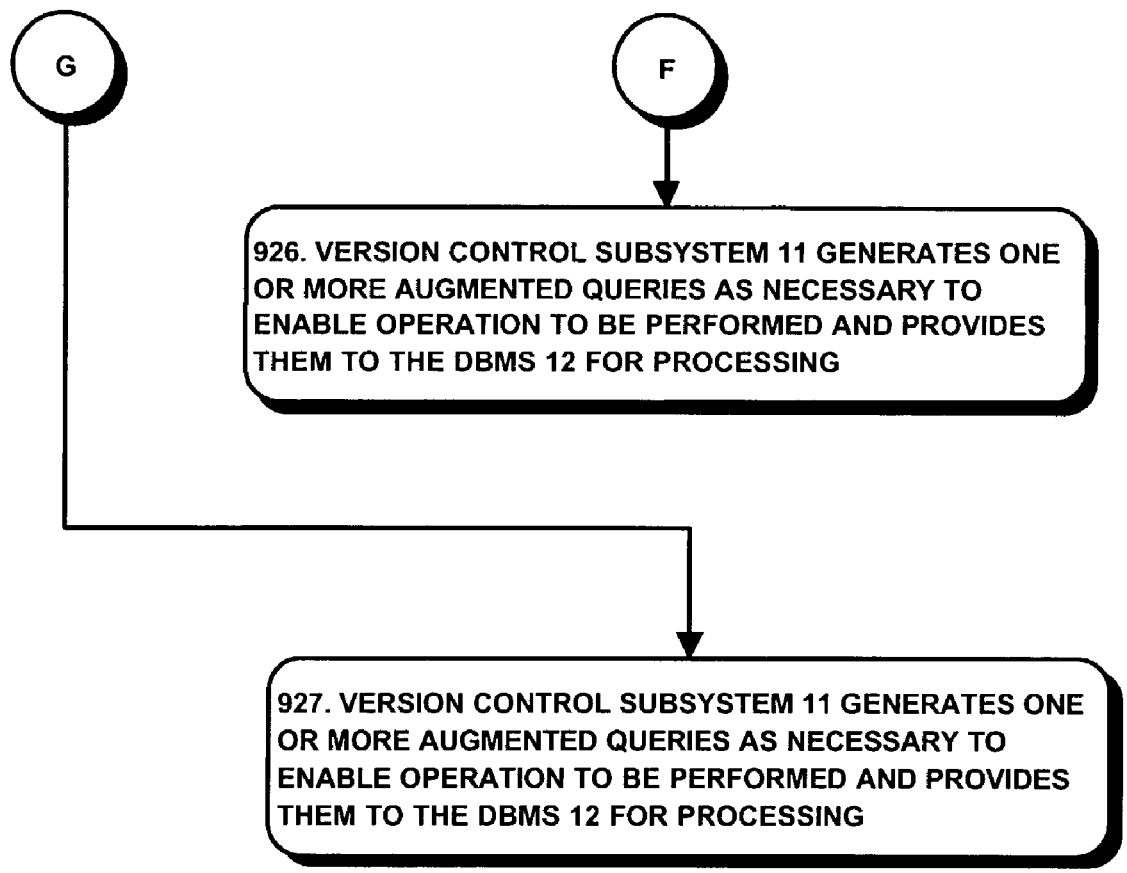
Figure 10:
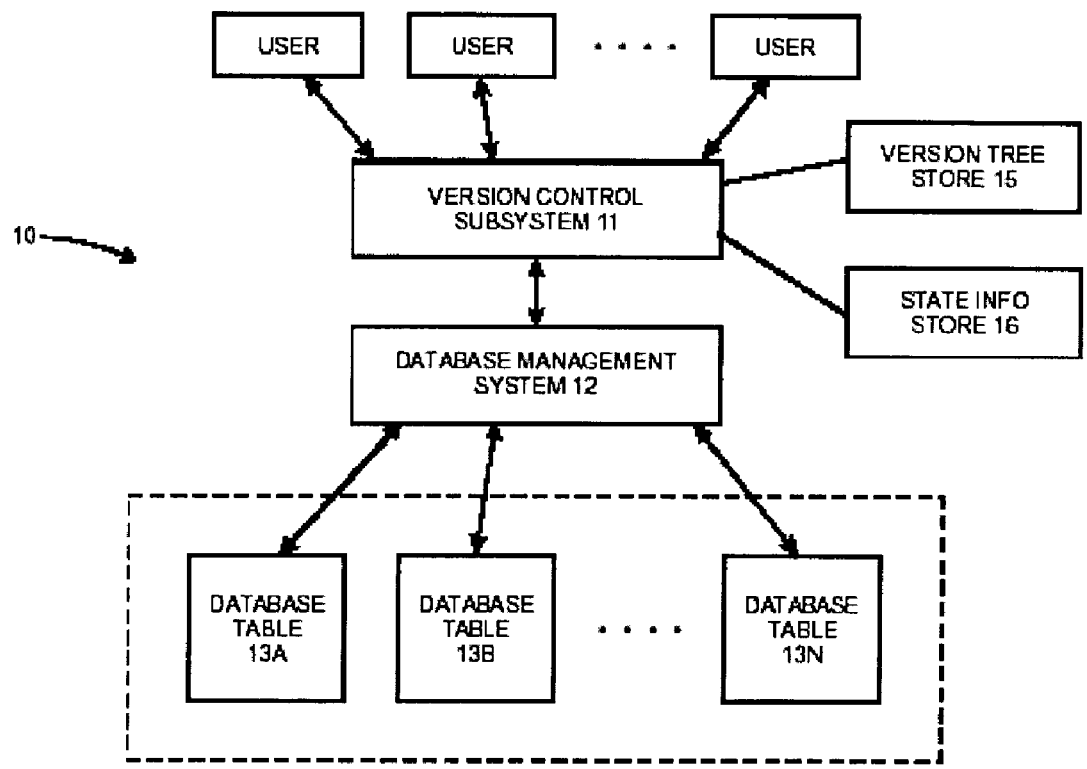
FIG. 10 is an overview of a VRDBMS that is referred to in the discussion of FIG. 9.
Figure 11:
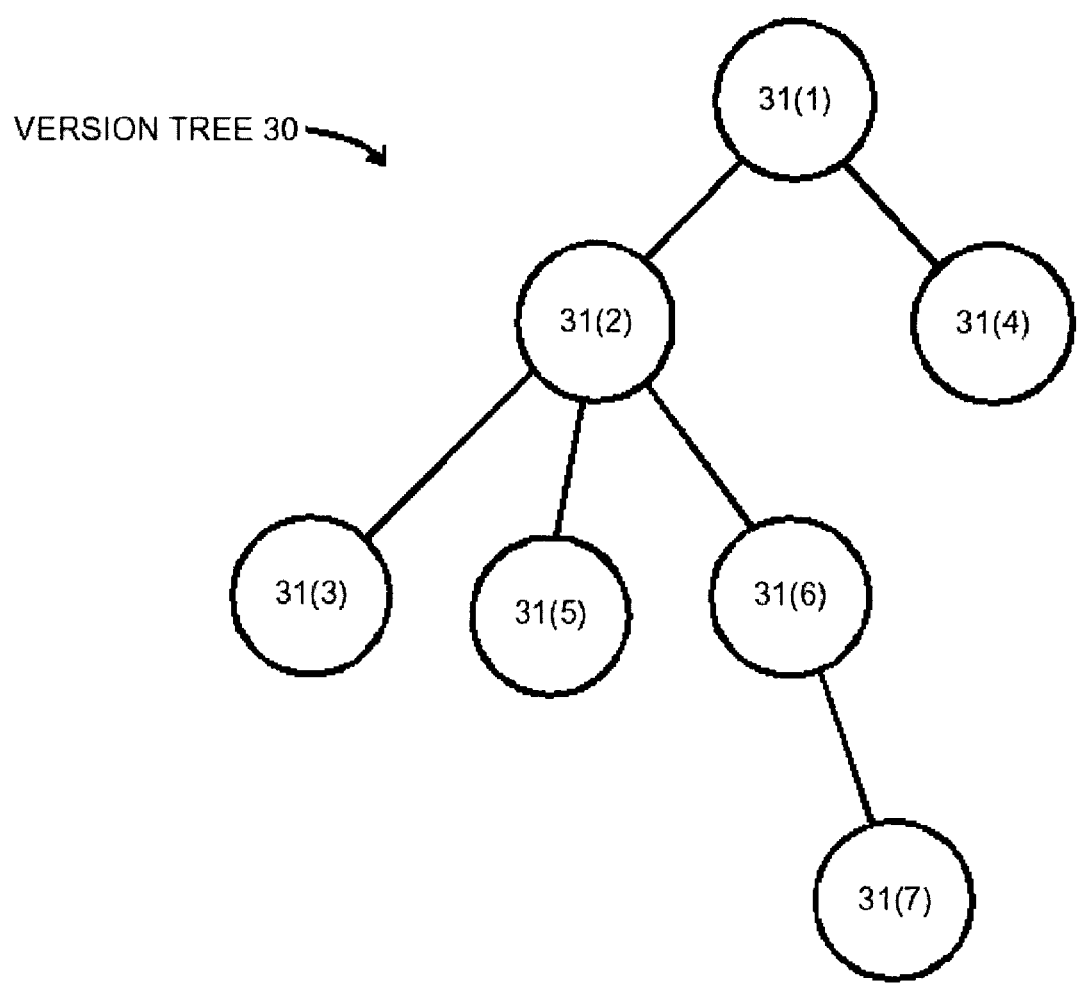
FIG. 11 is a version tree that is referred to in the discussion of FIG. 9.

The optimized constraint checking which is the subject matter of the present patent application is disclosed most clearly at 907 in FIG. 9A. In a presently-preferred embodiment of RIC checking, the constraint version views used for DML operations, continual refresh, refresh, merge, and a DDL operation which establishes a RIC constraint are the same as described above for the unique key constraint. In the RIC constraint, a table that has a column whose values are keys from another table is termed the child of the table in which the values are keys and the keys in the child table are termed foreign keys. The table from which the foreign keys are obtained is termed the parent table. When the operation changes a foreign key value in a child table, the constraint version view of the parent table must be checked to make sure that there is a key value corresponding to the changed foreign key value; similarly, when the operation deletes a key value in a parent table, the constraint version view of the child table must be checked for rows in which the deleted key is a foreign key.

Figure 8:
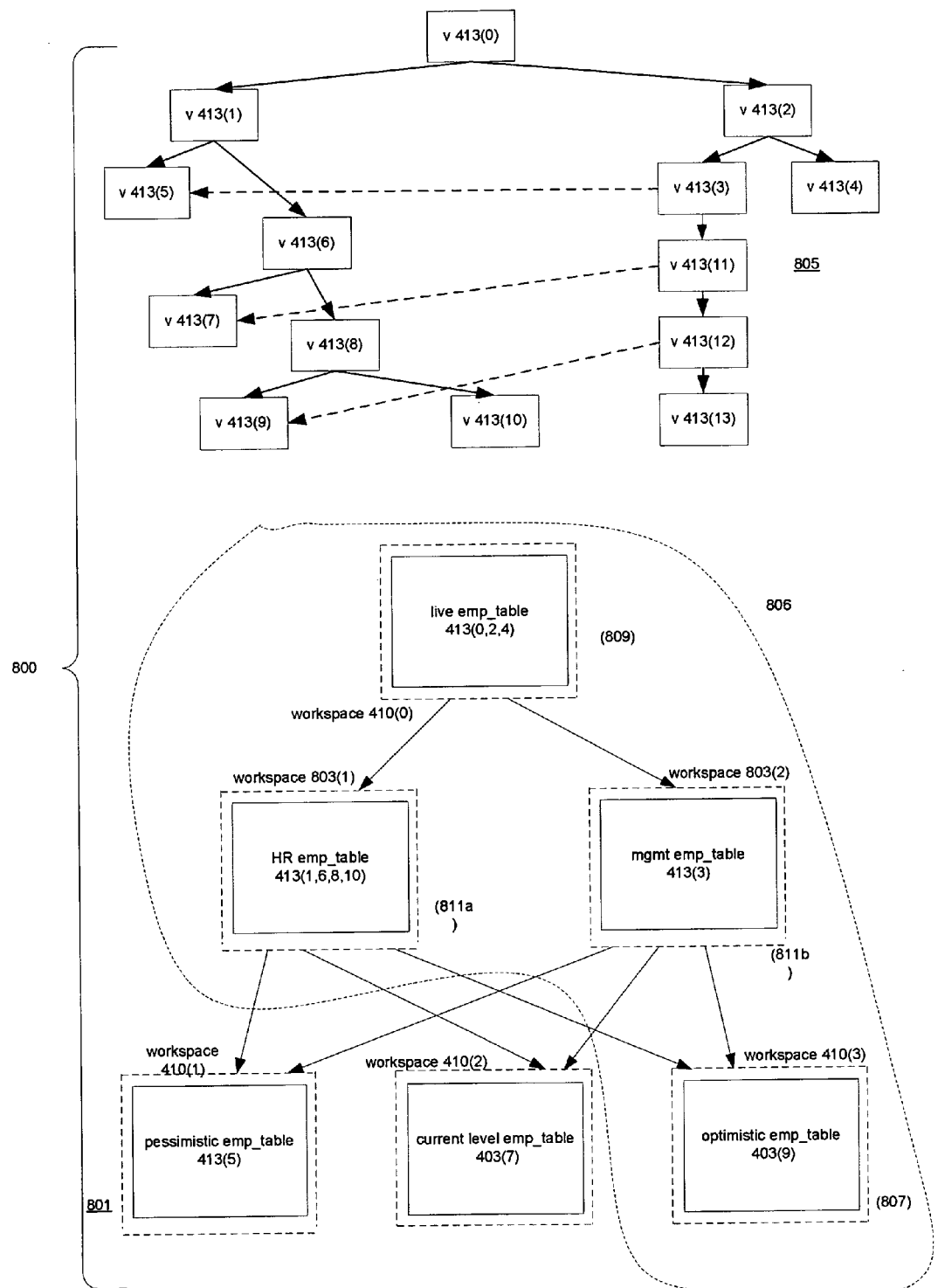
FIG. 8 shows workspaces and version DAGs in a VRDBS in which a workspace may have multiple parents.

Constraint Checking in a VRDBS which Permits a Workspace to have Multiple Parents: FIG. 8

Figure 4:
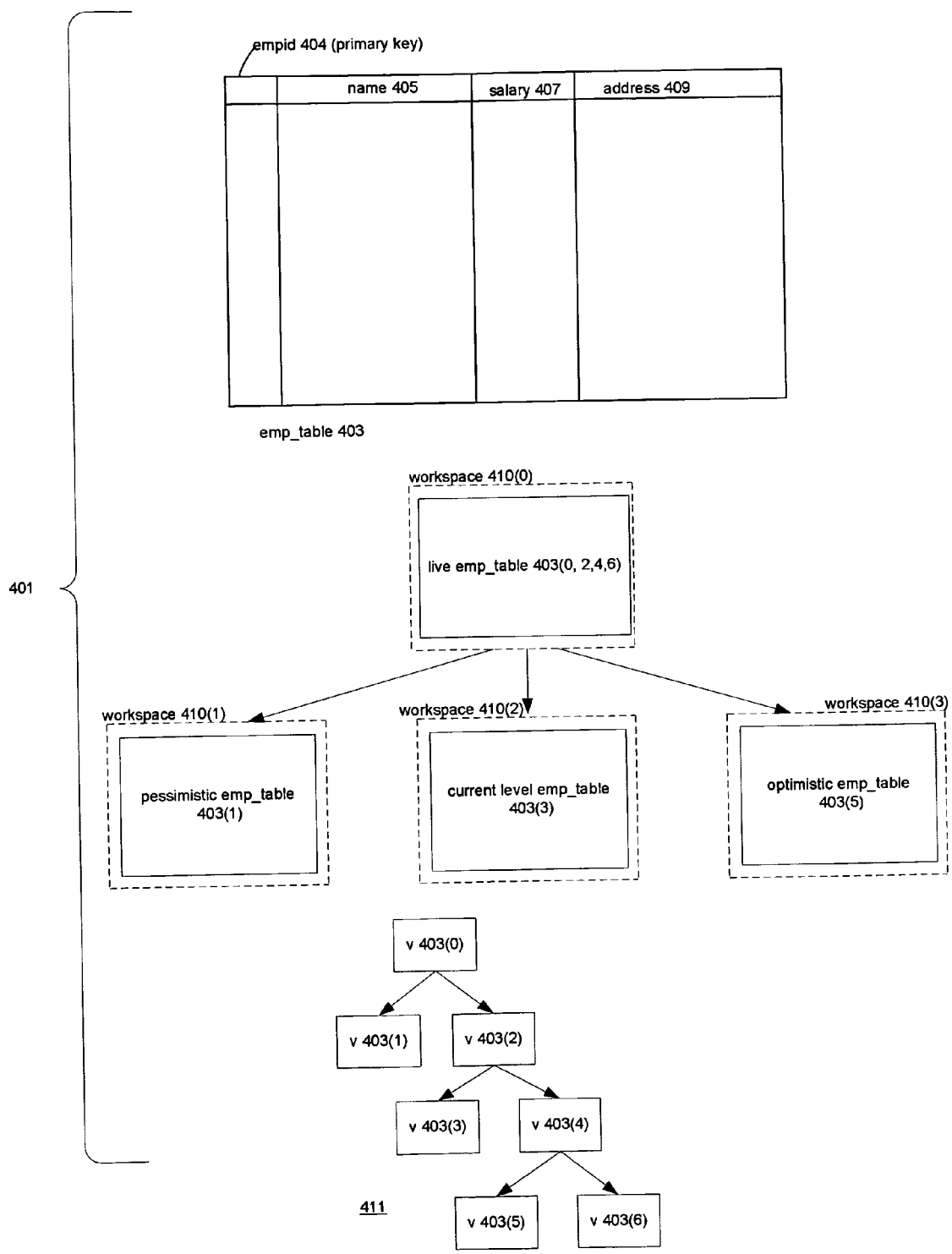
FIG. 4 illustrates a versioned relational database system.
Figure 5:
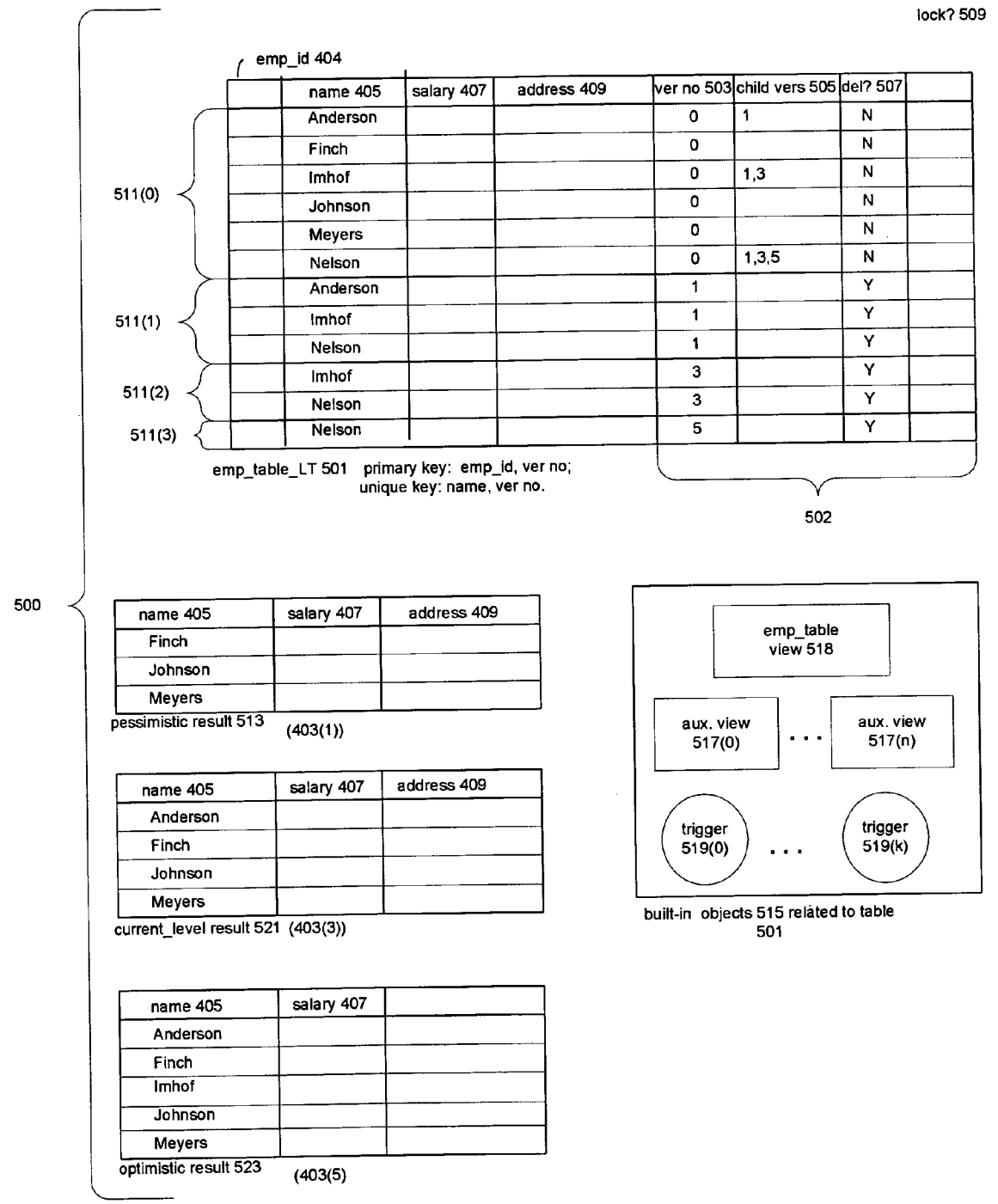
FIG. 5 shows details of an implementation of a versioned relational database system.

An implementation of the Oracle Workspace Manager which permits a workspace to have multiple parents is described in Sanjay Agarwal and Ramkrishna Chatterjee, Versioned database system with multi-parent versions, filed on even date with the present patent application. FIG. 8 shows at 800 the relationships between workspaces and the relationships between versions in this implementation of the Oracle Workspace Manager. FIG. 8 is based on the hierarchical workspace of FIG. 4, but two additional workspaces 803(1) and (2) have been added. These workspaces are children of workspace 410(0) and are both parents of each of workspaces 410(1–3). The graph 801 formed by the workspaces is thus no longer a hierarchy, but rather a directed acyclic graph. Similarly, the graph 803 formed by the versions that are accessible via the workspaces has versions that have more than one parent, and it, too, is a directed acyclic graph. In a preferred embodiment, a workspace is created with one parent. Workspaces that already exist in the VRDBS may be added as parents to a given workspace. The only restriction is that the additional parent may not already be an ancestor of the child workspace. When an additional parent is added to a workspace, the current version in the workspace to which the additional parent is being added also becomes a child of the current version in the additional parent workspace.

This is illustrated in FIG. 8. In that Figure, the order of creation of the workspaces is workspace 410(0), 803(1), 803(2), 410(1), 410(2), and 410(3). After workspace 410(3) has been created, workspace 803(2) is made an additional parent of workspaces 410(1 . . . 3). The add parent operation that makes a workspace an additional parent also does an implicit savepoint, thus producing a new version in the additional parent. In FIG. 2, there have been no explicit savepoint operations, so the versions are those created implicitly by the workspace creation and add parent operations. The versions created by the add parent operations are v 413(11–13). The resulting DAG of versions is shown at 805. In DAG 805, the arcs resulting from workspace 803(2) becoming an additional parent of workspaces 410(1 . . . 3) are shown with dashed lines.

The version DAG is important in determining versions that must be checked for constraint violations when a given version is changed. In a version DAG, the ancestry of a given version is the given version itself and all versions which are ancestors of the given version in the DAG. The ancestry of v 413(9) is v 413(9), v 413(8), v 413(6), v 413(1), v 413(0), v 413(12), v 413(11), v 413(3), and v 413(2).

The fact that a workspace may have more than one parent has significant consequences for change propagation operations and for the enforcement of constraints. As set forth in detail in the Versioned database system with multi-parent versions patent application, what happens with change propagation and constraint enforcement involving a multi-parent workspace is determined by the multi-parent graph 806 for the multi-parent workspace. A multi-parent graph 805 always has one leaf workspace (807), at least two intermediate workspaces (811(*a* and *b*)), and one root workspace (809). Leaf workspace 807 is a workspace that has more than one parent; the intermediate workspaces 811 are the parent workspaces of leaf workspace 814 (807) and all ancestor workspaces of the parent workspaces that lie between the parent workspaces and the nearest common ancestor of the parent workspaces. In the simple case of FIG. 8, the nearest common ancestor of intermediate nodes 811 (*a*) and (*b*) is also their only ancestor, namely root (809).

The effects of multi-parent graph 805 on change propagation and constraint enforcement stem from the fact that change propagation operations on leaf 807 involve all of the workspaces in the multi-parent graph: :

refresh: the version from which the current version in the leaf workspace is refreshed is the current version in every non-leaf workspace in the multi-parent graph. The operation also refreshes the current versions in all of the intermediate workspaces successively from the current version in the root workspace.

merge: the current version in the leaf workspace is merged with the current version in the root workspace.

A corollary of the way in which the refresh and merge operations are done on a version in a multi-parent workspace is the constraint checking which is done in connection with these operations must take into account the current versions in the workspaces of the leaf node's multi-parent graph 805 that are affected by the operations. For example, the constraint version view for the refresh operation where the workspace in which the operation is being performed is a multi-parent workspace is the version view for the current version in each of the intermediate nodes and the leaf node of the multi-parent graph.

Similarly, the constraint version view when a DDL statement adds a constraint to a version-enabled table is the version view for every version in the workspaces making up the multi-parent graph 805 for every multi-parent workspace 803 in the VRDBS. As is explained in more detail in the patent application cited above, constraint checking in a VRDBS system that permits multi-parent workspaces involves not only checking unique key constraints, but also primary key constraints and RIC constraints.

CONCLUSION

The foregoing Detailed Description has disclosed to those skilled in the relevant technologies how to make and use a versioned relational database system that performs optimistic constraint checks and has further disclosed the best mode known to the inventors of making their versioned relational database system. As demonstrated in the Detailed Description, it is possible to determine a subset of the versions in the versioned relational database system that must be checked for constraint violations resulting from a change in a given version and to maintain metadata which permits computation of the subset and of the rows within the versions of the subset that must be checked. In a versioned relational database system that maintains metadata that identifies a hierarchy of versions, the subset for a given version may be computed from the given version's ancestry. Within the given version's ancestry, the rows that must be checked for constraint violations belong to the given version's version view. The versioned relational database system in which the constraint checking techniques are employed uses workspaces to provide access to the versions. The workspaces are nodes in a hierarchy or in a DAG, and the graph to which a workspace belongs determines how change propagation operations propagate changes to and from a version in the workspace and thereby determine what versions are affected by changes and from that, what versions need to be checked for constraint violations.

As is apparent from the foregoing, the optimistic constraint checking described in the Detailed Description may be done in any versioned relational database system in which it is possible to maintain the metadata necessary to locate the versions which must be checked. The preferred embodiment is implemented in the Oracle Workspace Manager versioned relational database system, and many details of the preferred embodiment are thus particular to the Oracle Workspace Manager. Those skilled in the relevant technologies will immediately recognize that embodiments in other versioned relational database systems that practice the principles of the invention will differ in many particulars from the preferred embodiment described herein.

For this reason, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A versioned relational database system comprising:
   a set of versions of a table in a relational database system; and
   metadata that is automatically created and maintained by the relational database system, the metadata permitting determination of a proper subset of the versions, the subset including those versions in the set in which a constraint violation may occur as a result of an operation on the table that affects a given version, the versioned relational database system employing the metadata in the course of performing the operation to locate rows in the versions of the subset for which the operation may result in a violation of a constraint.

2. The versioned relational database system set forth in claim 1 wherein:
   the metadata includes metadata from which a directed acyclic graph of the versions may be determined; and
   the versions in the subset for the given version include the versions in an ancestry of the given version that includes the given version and the given version's ancestors in the branches of the directed acyclic graph to which the given version belongs.

3. The versioned relational database set forth in claim 2 wherein:
   the metadata includes a view which includes the ancestry of the given version.

4. The versioned relational database system set forth in claim 2 wherein:
   the located rows are the rows in the given version's ancestry that have the most recent versions of their primary keys.

5. The versioned relational database system set forth in claim 4 wherein:
   the metadata includes a view which computes the latest versions of the primary keys in the table.

6. The versioned relational database system set forth in claim 1 wherein:
   the constraint is a referential integrity constraint.

7. The versioned relational database system set forth in claim 1 wherein:
   the constraint is a unique key constraint.

8. The versioned relational database system set forth in claim 1 wherein:
   the operation affects the given version by modifying a row thereof.

9. The versioned relational database system set forth in claim 1 wherein:
   the operation affects the given version by modifying a set of constraints associated with the table.

10. The versioned relational database system set forth in claim 1 wherein:
    there is a plurality of the given versions affected by the operation; and
    the subset includes for each of the given versions in the plurality thereof those versions in the set in which a constraint violation may occur in consequence of the operation's effect on the given version.

11. Data storage apparatus that may be accessed by a computer system, the data storage apparatus being characterized in that:
    the data storage apparatus stores program code which, when executed in the computer system, implements a versioned relational database system comprising a set of versions of a table in a relational database system; and
    metadata that is automatically created and maintained by the relational database system, the metadata permitting determination of a proper subset of the versions, the subset including those versions in the set in which a constraint violation may occur as a result of an operation on the table that affects a given version, the computer system employing the metadata in the course of performing the operation to locate rows in the versions of the subset for which the operation may result in a violation of a constraint.

12. A versioned relational database system comprising:
a set of versions of a table in a relational database system;
a set of workspaces, a workspace giving access to a version; and
metadata that is automatically created and maintained by the relational database system, the metadata permitting determination of a proper subset of the versions, the subset including those versions in the set in which a constraint violation may occur as a result of an operation that affects a version that is accessible from a given workspace,
the versioned relational database system employing the metadata in the course of performing the operation to locate rows in versions of the subset for which the operation may result in a violation of a constraint.

13. The versioned relational database system set forth in claim 12 wherein:
the metadata includes metadata from which a directed acyclic graph of the versions may be determined; and
the versions in the subset for the given version include the versions in an ancestry of the given version that includes the given version and the given version's ancestors in the branches of the directed acyclic graph to which the given version belongs.

14. The versioned relational database system set forth in claim 13 wherein:
the metadata includes a view which includes all of the ancestry of the given version.

15. The versioned relational database system set forth in claim 13 wherein:
the located rows are the rows in the given version's ancestry that have the most recent versions of their primary keys.

16. The versioned relational database system set forth in claim 15 wherein:
the metadata includes a view which computes the latest versions of the primary keys in the table.

17. The versioned relational database system set forth in claim 12 wherein:
the operation is a change propagation operation in which a change in a version in a first one of the workspaces is propagated to a version in a second one of the workspaces.

18. The versioned relational database system set forth in claim 17 wherein:
the metadata includes metadata from which a directed acyclic graph of the workspaces may be determined; and
the change propagation operation propagates changes in a version in a given workspace up or down a branch in the directed acyclic graph to which the given workspace belongs.

19. The versioned relational database system set forth in claim 18 wherein:
the change propagation operation propagates changes in a version in the given workspace to a version in an ancestor of the given workspace in the directed acyclic graph.

20. The versioned relational database system set forth in claim 18 wherein:
the change propagation operation propagates changes in a version in an ancestor of the given workspace in the directed acyclic graph to a version in the given workspace.

21. The versioned relational database set forth in claim 18 wherein:
the directed acyclic graph is a hierarchy.

22. The versioned relational database system set forth in claim 12 wherein:
the operation affects the version in the given workspace by modifying a set of constraints associated with the table.

23. The versioned relational database set forth in claim 18 wherein:
a workspace that has multiple parents in the directed acyclic graph is the leaf node of a multi-parent graph of workspaces wherein the workspace that is the common ancestor of the multiple parent workspaces is the root node and the multiple parent workspaces and the workspaces in the directed acyclic graph between the multiple parent workspaces and the root node are intermediate nodes;
the metadata includes metadata from which a multiparent graph for a given multiparent workspace may be determined; and
the change propagation operations include a refresh operation that propagates changes from a version in a root node in the multiparent graph to versions in the non-root nodes.

24. The versioned relational database set forth in claim 18 wherein:
a workspace that has multiple parents is the leaf node of a multi-parent graph of workspaces wherein the workspace that is the common ancestor of the multiple parent workspaces is the root node and the multiple parent workspaces and the workspaces in the directed acyclic graph between the multiple parent workspaces and the root node are intermediate nodes;
the metadata includes metadata from which a multiparent graph for a given multiparent workspace may be determined; and
the change propagation operations include a merge operation that propagates changes from versions in non-root nodes in the multiparent graph to a version in the root node.

25. Data storage apparatus that may be accessed by a computer system, the data storage apparatus being characterized in that:
the data storage apparatus stores program code which, when executed in the computer system, implements a versioned relational database system comprising
a set of versions of a table in a relational database system;
a set of workspaces, a workspace giving access to a version;
metadata that is automatically created and maintained by the relational database system, the metadata permitting determination of a proper subset of the versions, the subset including those versions in the set in which a constraint violation may occur as a result of an operation that affects a version that is accessible from a given workspace,
the computer system employing the metadata in the course of performing the operation to locate rows in versions of the subset for which the operation may result in a violation of a constraint.

26. A method of enforcing a constraint in a set of versions in a versioned relational database system,
the method comprising the steps performed in the database system of:
automatically creating and maintaining metadata in the relational database system from which a proper subset of the set may be determined, the subset including the versions in which a constraint violation may occur as a result of an operation that is performed on a given version; and when performing an operation on the given version that may result in a violation of a constraint, employing the metadata to determine for the versions of the subset whether the operation will result in a violation of a constraint.

27. The method set forth in claim 26 wherein the metadata further includes metadata from which a directed acyclic graph of the versions may be determined and the method further comprises the steps of:

determining at least one version that is affected by an operation that may result in a constraint violation; and for each version that is so affected, using the metadata to determine an ancestry of the affected version that includes the affected version and the affected version's ancestors in the directed acyclic graph; and locating any rows in versions in the ancestry for which the operation will result in a constraint violation.

28. The method set forth in claim 27 wherein:

the step of maintaining the metadata includes maintaining a view which includes all of the versions in the ancestry of the given version; and the view is used in the step of using the metadata.

29. The method set forth in claim 27 wherein the step of locating any rows includes the step of:

determining whether a row has a primary key that is the latest version of the primary key in the affected version's ancestry.

30. The method set forth in claim 29 wherein:

the step of maintaining the metadata includes maintaining a view which computes the latest versions of the primary keys in the table; and the view is used in the step of using the metadata.

31. The method set forth in claim 27 wherein:

the directed acyclic graph is a hierarchy.

32. The method set forth in claim 26 wherein:

the constraint is a unique key constraint.

33. The method set forth in claim 26 wherein:

the constraint is a referential integrity constraint.

34. The method set forth in claim 26 wherein:

the operation modifies a set of constraints associated with the table; and every version of the table is affected by the operation.

35. Data storage apparatus that may be accessed by a computer system, the data storage apparatus being characterized in that:

the data storage apparatus stores program code which, when executed in the computer system, performs a method of enforcing a constraint in a set of versions in a versioned relational database system comprising the steps of:

automatically creating and maintaining metadata in the relational database system from which a proper subset of the set may be determined, the subset including the versions in which a constraint violation may occur as a result of an operation that is performed on a given version; and when performing an operation on the given version that may result in a violation of a constraint, employing the metadata to determine for the versions of the subset whether the operation will result in a violation of a constraint.

36. A method of enforcing a constraint in a set of versions in a versioned relational database system that further includes a set of workspaces, a workspace giving access to a version, and the method comprising the steps performed in the relational database system of:

automatically defining and maintaining metadata in the relational database system from which a proper subset of the versions may be determined, the subset including those versions in the set in which a constraint violation may occur as a result of an operation that affects a version that is accessible from a given workspace; and employing the metadata in the course of performing the operation to locate rows in versions of the subset for which the operation may result in violation of a constraint.

37. The method set forth in claim 36 wherein:

the step of maintaining the metadata includes maintaining metadata from which a directed acyclic graph of the versions may be determined; and in the step of employing the metadata, the versions in the subset for the affected version include the versions in an ancestry of the affected version, the ancestry including the affected version and the affected version's ancestors in the directed acyclic graph.

38. The method set forth in claim 37 wherein:

the step of maintaining the metadata includes maintaining metadata from which a directed acyclic graph of the workspaces may be determined; and the operation is a change propagation operation in which a change in a version in a first one of the workspaces is propagated up or down the workspace directed acyclic graph to an affected version in a second one of the workspaces.

39. The method set forth in claim 38 wherein:

the operation is a refresh operation wherein a change is propagated from a first version in an ancestor workspace for a given workspace in the directed acyclic graph to a second version in the given workspace; and the second version is the affected version.

40. The method set forth in claim 38 wherein:

the operation is a merge operation wherein a change is propagated from a first version in a given workspace to a second version in an ancestor workspace for the given workspace in the directed acyclic graph; and the second version is the affected version.

41. The method set forth in claim 38 wherein:

the workspace directed acyclic graph is a hierarchy.

42. The method set forth in claim 38 wherein:

a workspace that has multiple parents is the leaf node of a multi-parent graph of workspaces wherein the workspace that is the common ancestor of the multiple parent workspaces is the root node and the multiple parent workspaces and the workspaces in the directed acyclic graph between the multiple parent workspaces and the root node are intermediate nodes;

the step of maintaining the metadata includes maintaining metadata from which a multi-parent graph for a given multi-parent workspace may be determined; and the change propagation operations include a refresh operation that propagates changes from a version in a root node in the multiparent graph to affected versions in the intermediate nodes and in the leaf node.

43. The method set forth in claim 38 wherein:

a workspace that has multiple parents is the leaf node of a multi-parent graph of workspaces wherein the workspace that is the common ancestor of the multiple parent workspaces is the root node and the multiple parent workspaces and the workspaces in the directed acyclic graph between the multiple parent workspaces and the root node are intermediate nodes;

the step of maintaining the metadata includes maintaining metadata from which a multi-parent graph for a given multi-parent workspace may be determined; and the change propagation operations include a merge operation that propagates changes from a version in a leaf node in the multiparent graph to a version in the root node.

44. Data storage apparatus that may be accessed by a computer system, the data storage apparatus being characterized in that:

the data storage apparatus stores program code which, when executed in the computer system, performs a method of enforcing a constraint in a set of versions in a versioned relational database system that further includes a set of workspaces, a workspace giving access to a version, and the method comprises the steps performed in the relational database system of:

automatically creating and maintaining metadata in the relational database system from which a proper subset of the versions may be determined, the subset including those versions in the set in which a constraint violation may occur as a result of an operation that affects a version that is accessible from a given workspace; and employing the metadata in the course of performing the operation to locate rows in versions of the subset for which the operation may result in violation of a constraint.

* * * * *